(12) United States Patent
Chamness et al.

(10) Patent No.: US 11,483,643 B2
(45) Date of Patent: Oct. 25, 2022

(54) PLAYBACK DEVICES HAVING WAVEGUIDES

(71) Applicant: Sonos, Inc., Santa Barbara, CA (US)

(72) Inventors: Michael Chamness, Glouchester, MA (US); Greg Flanagan, Santa Barbara, CA (US); Camille Zaba, Zaba, CA (US); Brandon Holley, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 126 days.

(21) Appl. No.: 16/882,864

(22) Filed: May 26, 2020

(65) Prior Publication Data

US 2021/0078551 A1    Mar. 18, 2021

Related U.S. Application Data

(63) Continuation of application No. 16/522,203, filed on Jul. 25, 2019, which is a continuation of application
(Continued)

(51) Int. Cl.
| | |
|---|---|
| *H04R 1/28* | (2006.01) |
| *H04R 1/02* | (2006.01) |
| *H04R 1/36* | (2006.01) |
| *B60T 8/1761* | (2006.01) |
| *B60T 13/66* | (2006.01) |
| *B60T 13/68* | (2006.01) |

(52) U.S. Cl.
CPC .......... *H04R 1/2857* (2013.01); *B60T 8/1761* (2013.01); *B60T 13/662* (2013.01); *B60T 13/686* (2013.01); *H04R 1/025* (2013.01); *H04R 1/288* (2013.01); *H04R 1/36* (2013.01); *H04R 2420/07* (2013.01)

(58) Field of Classification Search
CPC ...... H04R 1/2857; H04R 1/025; H04R 1/288; H04R 1/36; H04R 2420/07; B60T 8/1761; B60T 13/662; B60R 13/686
USPC ............................................. 381/338; 701/71
See application file for complete search history.

(56) References Cited

U.S. PATENT DOCUMENTS

| | | |
|---|---|---|
| 5,402,502 A | 3/1995 | Boothroyd et al. |
| 5,440,644 A | 8/1995 | Farinelli et al. |
| (Continued) | | |

FOREIGN PATENT DOCUMENTS

| | | |
|---|---|---|
| EP | 1389853 A1 | 2/2004 |
| WO | 200153994 | 7/2001 |
| WO | 2003093950 A2 | 11/2003 |

OTHER PUBLICATIONS

AudioTron Quick Start Guide, Version 1.0, Mar. 2001, 24 pages.
(Continued)

*Primary Examiner* — Sean H Nguyen
(74) *Attorney, Agent, or Firm* — Akerman LLP

(57) ABSTRACT

A playback device comprises an electroacoustic transducer; an acoustic waveguide in fluid communication with the transducer; and a housing delimiting an opening of the waveguide, the opening extending around an axis passing through the transducer. The opening may have a radial distance from the axis that varies with an azimuthal angle about the axis. An acoustic path length within the waveguide, between the transducer and the opening, is substantially constant and independent of azimuthal angle about the axis.

20 Claims, 16 Drawing Sheets

Related U.S. Application Data

No. 15/942,819, filed on Apr. 2, 2018, now Pat. No. 10,397,694.

(56) References Cited

U.S. PATENT DOCUMENTS

| | | | |
|---|---|---|---|
| 5,761,320 | A | 6/1998 | Farinelli et al. |
| 5,923,902 | A | 7/1999 | Inagaki |
| 6,032,202 | A | 2/2000 | Lea et al. |
| 6,256,554 | B1 | 7/2001 | Dilorenzo |
| 6,404,811 | B1 | 6/2002 | Cvetko et al. |
| 6,469,633 | B1 | 10/2002 | Wachter et al. |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,942,252 | B2 | 1/2015 | Balassanian et al. |
| 10,356,512 | B1 * | 7/2019 | Peace, Jr. ............... H04R 1/345 |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty |
| 2004/0024478 | A1 | 2/2004 | Hans et al. |
| 2007/0142944 | A1 | 6/2007 | Goldberg et al. |
| 2009/0285432 | A1 | 11/2009 | Schnitta et al. |
| 2011/0116670 | A1 | 5/2011 | Lasserre et al. |
| 2011/0274306 | A1 | 11/2011 | Adams |
| 2013/0058518 | A1 | 3/2013 | Held |
| 2014/0093114 | A1 | 4/2014 | Nguyen et al. |
| 2015/0014089 | A1 | 1/2015 | Sprinkle |
| 2015/0365758 | A1 | 12/2015 | Bridge |
| 2016/0212523 | A1 | 7/2016 | Spillmann et al. |
| 2017/0055067 | A1 | 2/2017 | Moro et al. |

OTHER PUBLICATIONS

AudioTron Reference Manual, Version 3.0, May 2002, 70 pages.
AudioTron Setup Guide, Version 3.0, May 2002, 38 pages.
Bluetooth "Specification of the Bluetooth System: The ad hoc SCATTERNET for affordable and highly functional wireless connectivity," Core, Version 1.0 A, Jul. 26, 1999, 1068 pages.
Bluetooth "Specification of the Bluetooth System: Wireless connections made easy," Core, Version 1.0 B, Dec. 1, 1999, 1076 pages.
Calton et al., "Modeling acoustic resonators: From theory to application", Aug. 12, 2015, XP055589426, Retrieved from the Internet: URL:https://www.physics.byu.edu/download/publication/2821 [retrieved on May 16, 2019].
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
International BUREAU, International Preliminary Report on Patentability and Written Opinion, dated Oct. 15, 2020, issued in connection with International Application No. PCT/US2019/025193, filed on Apr. 1, 2019, 8 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Dec. 27, 2018, issued in connection with U.S. Appl. No. 15/942,819, filed Apr. 2, 2018, 13 pages.
Notice of Allowance dated Jan. 13, 2020, issued in connection with U.S. Appl. No. 16/552,203, filed Aug. 27, 2019, 8 pages.
Notice of Allowance dated Apr. 15, 2019, issued in connection with U.S. Appl. No. 15/942,819, filed Apr. 2, 2018,10 pages.
Palm, Inc., "Handbook for the Palm VII Handheld," May 2000, 311 pages.
Presentations at WinHEC 2000, May 2000, 138 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

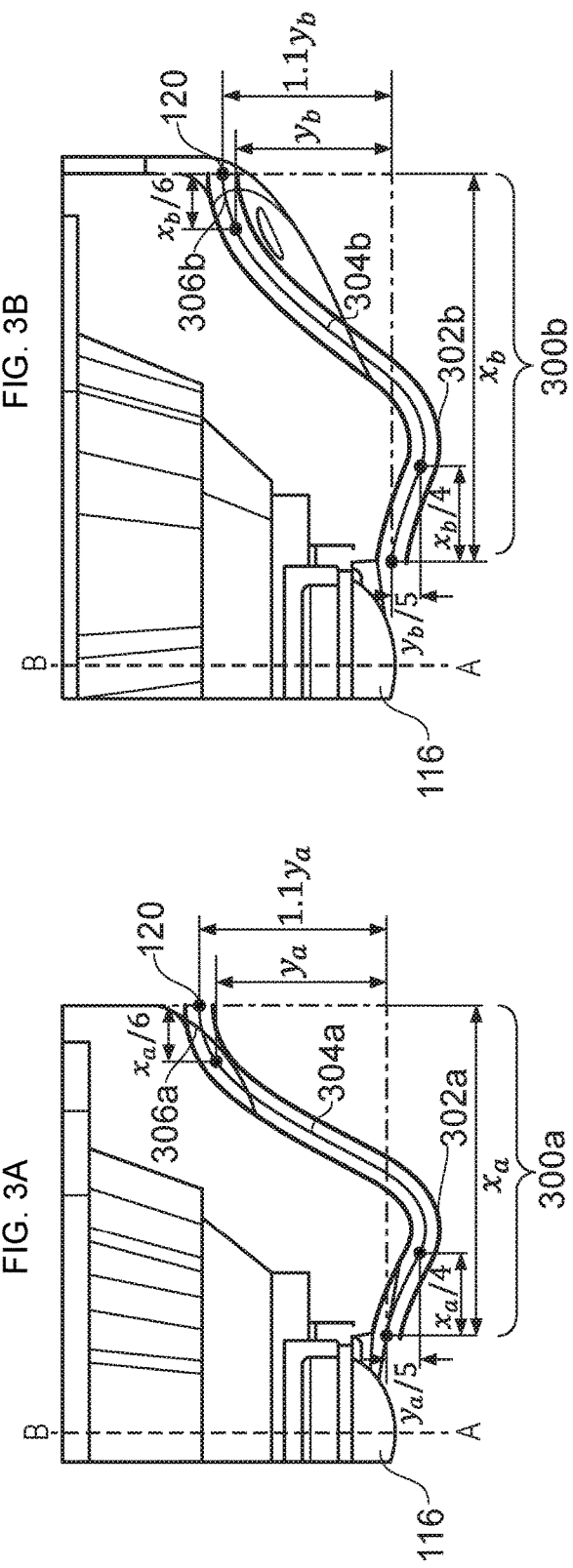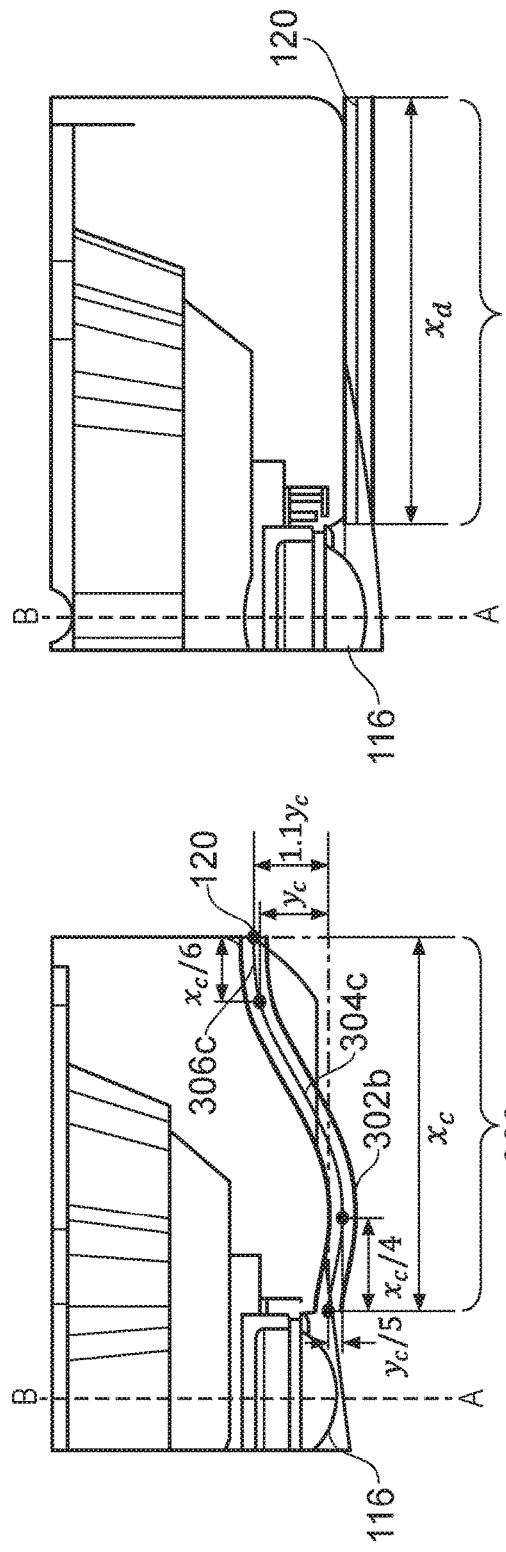

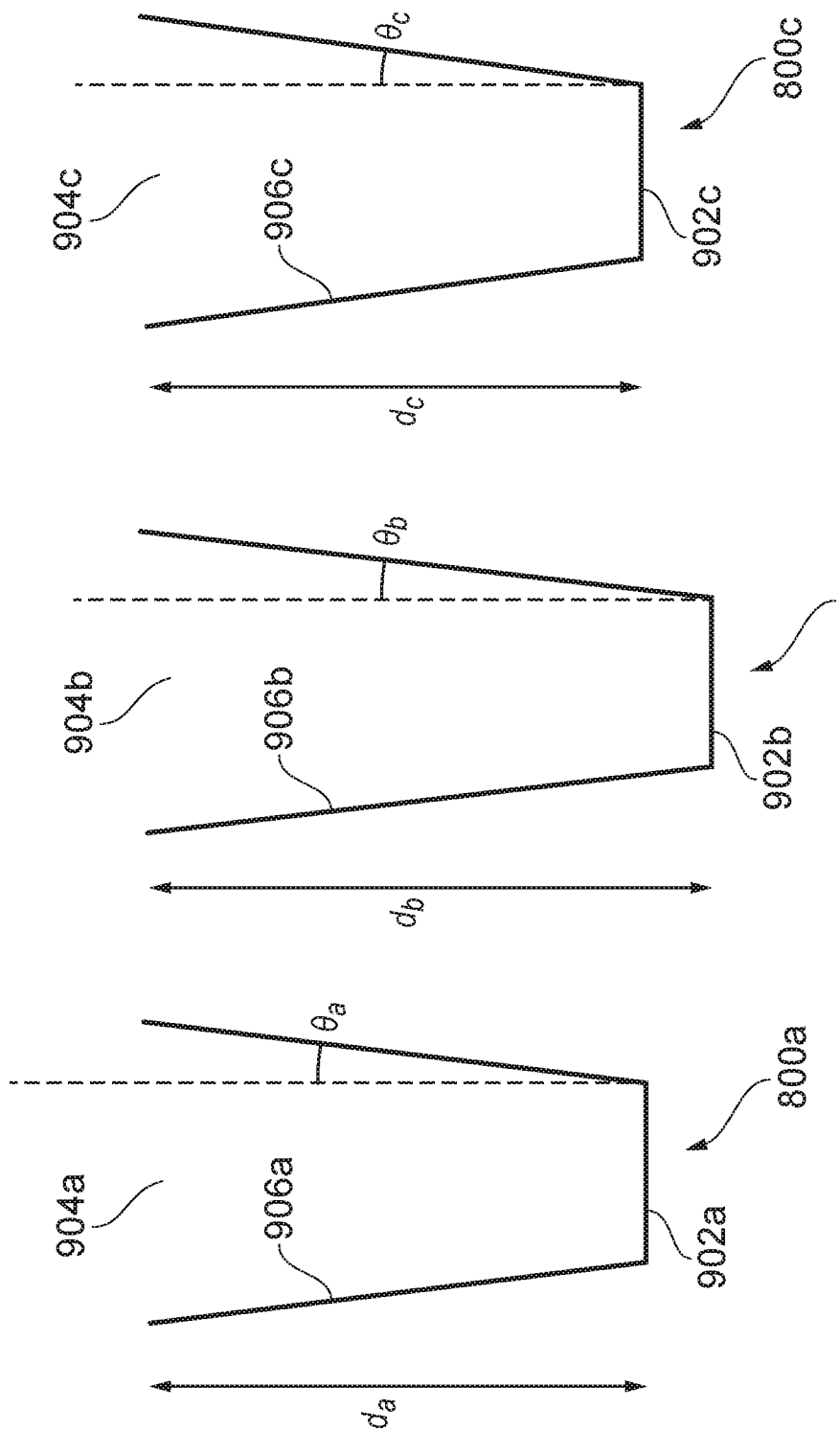

US 11,483,643 B2

PLAYBACK DEVICES HAVING WAVEGUIDES

CROSS-REFERENCE TO RELATED APPLICATIONS

This application is a continuation of U.S. application Ser. No. 16/552,203 titled "Playback Devices Having Waveguides," filed on Aug. 27, 2019, and issued as U.S. Pat. No. 10,667,041 on May 26, 2020; U.S. application Ser. No. 16/552,203 is a continuation of U.S. application Ser. No. 15/942,819 titled "Playback Devices Having Waveguides," filed on Apr. 2, 2018, and issued as U.S. Pat. No. 10,397,694 on Aug. 27, 2019. The entire contents of U.S. application Ser. Nos. 16/552,203 and 15/942,819 are incorporated herein by reference.

TECHNICAL FIELD

The disclosed technology generally relates to audio playback devices. Specifically, the disclosed technology relates to playback devices configured for emitting acoustic waves with wide angular dispersion.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play audio in any room that has a networked playback device. Additionally, using the control device, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

FIG. 3A is a first cross-sectional side view of a waveguide portion along a corresponding angle around the axis of the playback device of FIG. 1.

FIG. 3B is a second cross-sectional side view of a waveguide portion along a corresponding angle around the axis of the playback device of FIG. 1.

FIG. 3C is a third cross-sectional side view of a waveguide portion along a corresponding angle around the axis of the playback device of FIG. 1.

FIG. 3D is a fourth cross-sectional side view of a waveguide portion along a corresponding angle around the axis of the playback device of FIG. 1.

FIG. 9A is a cross-sectional view of a first hollow tube resonator.

FIG. 9B is a cross-sectional view of a second hollow tube resonator.

FIG. 9C is a cross-sectional view of a third hollow tube resonator.

DETAILED DESCRIPTION

Figure 1:
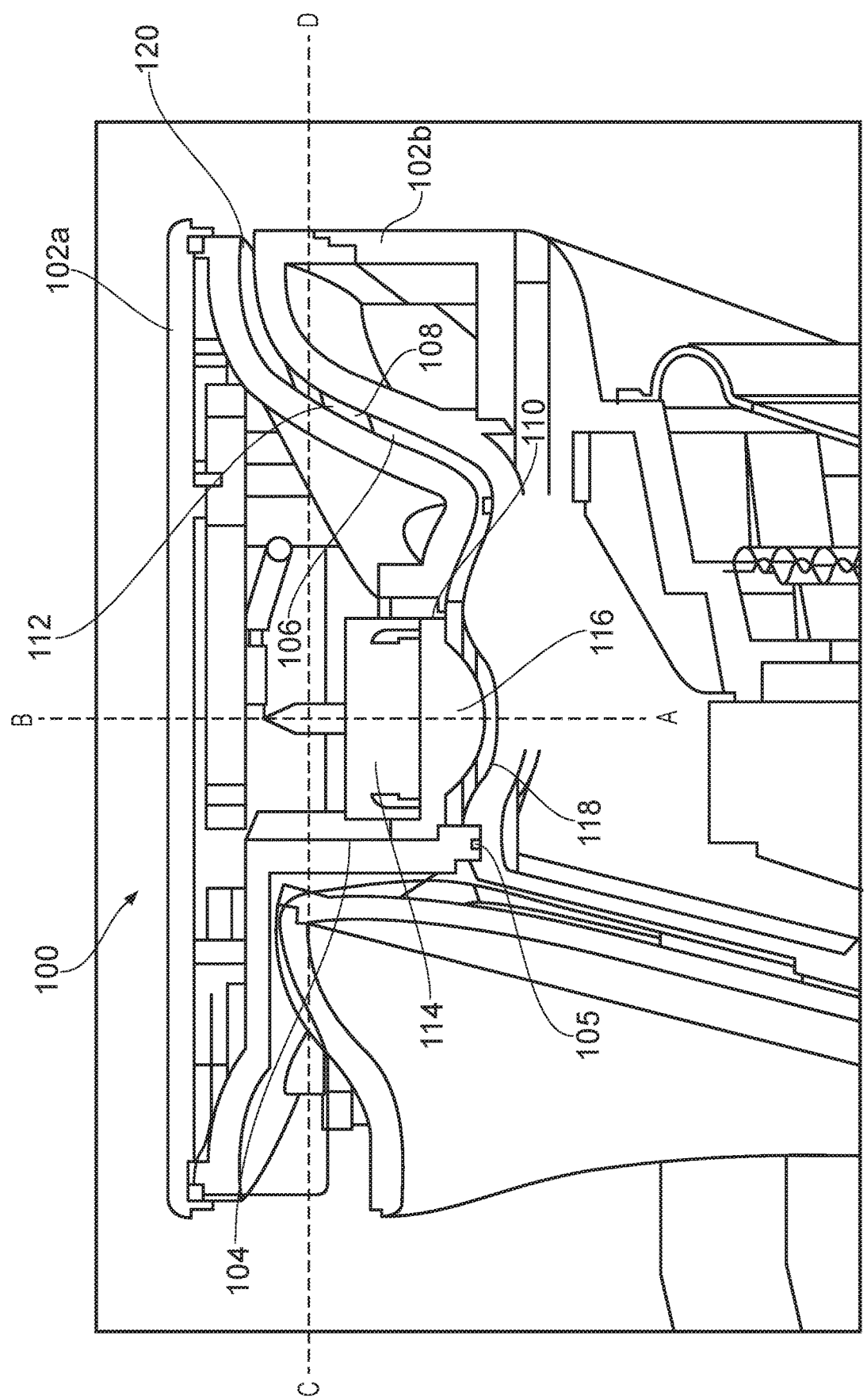
FIG. 1 is a cross-sectional side view in an axial plane of a playback device configured in accordance with embodiments of the disclosed technology.

A conventional tweeter system in an audio playback device includes a diaphragm that is displaced in response to an alternating electrical signal, thereby generating high-frequency acoustic waves (for example, acoustic waves having a frequency of between about 2 kilohertz (kHz) and about 20 kHz). The diaphragm in many cases is shaped as a cupola, and may be surrounded by an acoustic lens that diffracts the generated acoustic waves. A cupola-shaped diaphragm and an acoustic lens can be used to achieve angular dispersion of the waves as they are emitted from the tweeter system. However, due to the relatively short wavelengths of the emitted waves in comparison with the aperture of the acoustic lens, the angular dispersion of the emitted waves is limited to a relatively narrow angle. An angular dispersion of around 10 degrees from normal can be typical for waves having frequencies in the middle of the tweeter's operating range (e.g., between about 6 kHz and about 10 kHz).

Angular dispersion is particularly desirable for playback devices designed to be used in non-reverberant environments (e.g., outdoor environments). In typical outdoor scenarios, for example, such a playback device is not surrounded by walls, and therefore angular dispersion is necessary to ensure listeners at different angles around the playback device are able to hear audio generated by the playback device. It is desirable for users located at different angles around the playback device to have similar listening experiences.

According to a first embodiment of the disclosed technology, a playback device includes an electroacoustic transducer (e.g., a speaker driver), and an acoustic waveguide in fluid communication with the transducer. A housing of the playback device delimits an opening of the waveguide, the opening extending around an axis passing through the transducer and having a radial distance from the axis that varies with an azimuthal axis about the axis. An acoustic path length within the waveguide, between the transducer and the opening, is substantially constant and independent of azimuthal angle about the axis.

Providing an acoustic path length that is substantially constant and independent of azimuthal angle causes acoustic wave fronts emitted from the opening to spread out evenly, resulting in substantially uniform directivity such that listeners positioned at different locations around the playback device will have similar listening experiences.

According to a second embodiment of the present invention, a playback device includes an electroacoustic transducer, and an acoustic waveguide in fluid communication with the transducer. A housing of the playback device delimits an opening of the waveguide, the opening extending around an axis passing through the transducer. The waveguide is bounded on one side by an axial wall, and an absorber is disposed between the axis and the axial wall and configured to attenuate acoustic waves within a predetermined frequency band. The absorber thereby reduces a variation of intensity around the axis of acoustic waves generated by the transducer and emitted from the opening within the predetermined frequency band.

According to a third embodiment of the present invention, a playback device includes an electroacoustic transducer, and an acoustic waveguide in fluid communication with the transducer. A housing of the playback device delimits an opening of the waveguide, the opening extending around an axis passing through the transducer. The opening has a dimension in a direction aligned with the axis that varies with an azimuthal angle about the axis, thereby reducing a variation of intensity around the axis of acoustic waves generated by the transducer and emitted from the opening.

Reducing a variation of intensity around the axis of acoustic waves generated by the transducer and emitted from the opening leads to more uniform directivity, such that listeners positioned at different locations around the playback device will have similar listening experiences.

FIG. 1 is a cross-sectional side view in an axial plane of a playback device configured in accordance with embodiments of the disclosed technology configured in accordance with embodiments of the disclosed technology. The playback device 100 has an upper housing 102a and a lower housing 102b (collectively referred to as a housing 102). An axial wall 104 of the upper housing 102a is received by a recess, indent or groove 105 of the lower housing 102b, and extends in an axial direction of an axis AB (referred to hereafter as the axial direction) of a plane ABCD passing through the playback device 100.

The upper housing 102a and the lower housing 102b form an upper surface 106 and a lower surface 108, respectively, of an acoustic waveguide 112. The upper surface 106 has an aperture 110 for receiving an electroacoustic transducer 114. The transducer 114 is disposed on the axis AB and includes a dome or a cupola 116 in fluid communication with the waveguide 112. The lower surface 108 extends from the axial wall 104 and includes a recess 118 configured to receive the cupola 116. The upper surface 106 and the lower surface 108 extend toward an opening 120 of the waveguide 112.

The cupola 116 is configured to be displaced in the direction of the axis AB in response to an alternating electric signal received by the transducer 114, thereby generating acoustic waves. In this embodiment, the transducer 114 is a tweeter, and the transducer 114 produces acoustic waves having a relatively high frequency, for example between about 2 kHz and about 20 kHz A portion of the upper surface 106 of the waveguide 112 surrounds the transducer 114, and at least partially axially overlaps the transducer 114 with respect to the axis AB. In other examples, the lower surface 108 surrounds the transducer 114.

Figure 2:
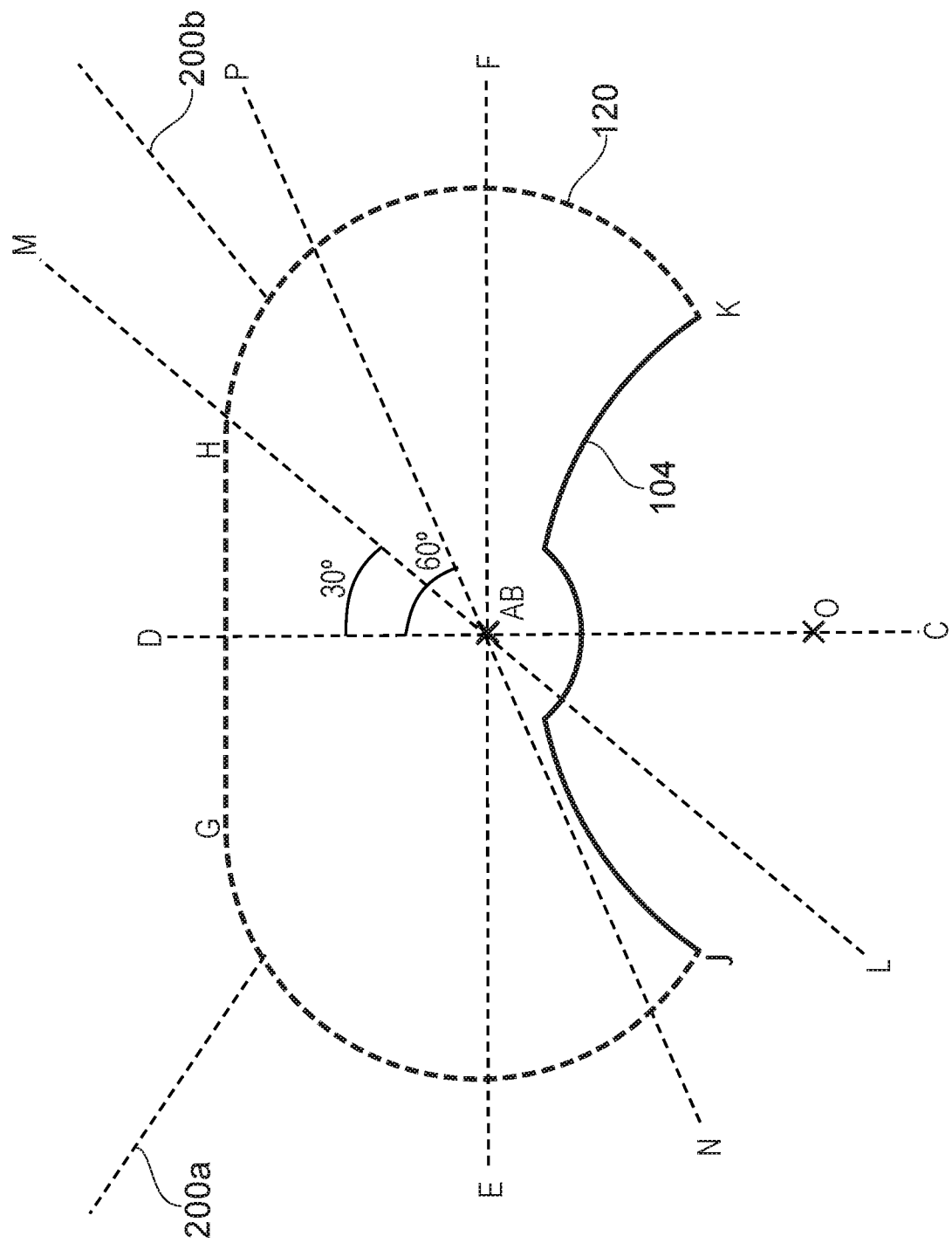
FIG. 2 is a cross-sectional plan view of the playback device of FIG. 1 in a plane perpendicular to the axial plane of FIG. 1.

The opening 120 of the waveguide 112 has a dimension in the axial direction that is relatively small compared with the wavelengths of acoustic waves generated by the transducer 114. Waves generated by the transducer typically have wavelengths, for example, between about 2 centimeters (cm) and 20 cm. The dimension of the opening 120 in the axial direction in this embodiment is less than 1 cm, resulting in a relatively wide angular dispersion in planes coplanar with the axis AB FIG. 2 is a cross-sectional plan view of the playback device of FIG. 1 in a plane perpendicular to the axial plane of FIG. 1. FIG. 2 shows a projection of the opening 120 of the waveguide 112 onto a plane CDEF perpendicular to the plane ABCD. In the illustrated embodiment, the opening 120 extends around the axis AB, and subtends an angle of between 180 degrees and 360 degrees from the axis AB. In some embodiments, for example, the opening 112 may subtend an angle of less than 180 degrees. Experiments have shown that angular dispersions of between 180 degrees and 240 degrees are suitable for outdoor usage, whilst reducing the impact of back reflection in situations where the playback device 100 is placed adjacent a wall. Back reflections from a wall may lead to undesirable acoustic effects, such as those caused by interference between back-reflected waves and waves arriving directly from the playback device. In other embodiments, however, the opening 120 subtends a suitable angle less than 180 degrees (e.g., 90 degrees, 135 degrees, 170 degrees).

The radial distance from the axis AB to the opening 120 varies with azimuthal angle about the axis AB. In this embodiment, the opening 120 has a minimum radial distance from the axis AB in a direction CD, and a maximum radial distance from the axis AB in a direction EF that is perpendicular to the direction CD. The projection of the opening 120 onto the plane CDEF is elongate, extending farther in the direction EF than in the direction CD. The projection follows an arc of a stadium having a straight portion GH and two circular arc portions GJ and HK. In other examples, openings may follow other paths, for example an elliptical arc, an oval arc, or an irregular arc. In some examples, an opening may follow a complete path around an axis. In some examples, a projection of an opening may have substantially the same extent in two perpendicular directions. For example, a projection of an opening may follow a circular arc or a complete circular path.

The axial wall 104 comprises a concave portion and two convex portions. The concave portion has a projection onto the plane CDEF of a circular arc centered at the axis AB. The two convex portions have projections onto the plane CDEF of circular arcs centered at a point O outside the playback device 100, the projections passing between the point O and the axis AB. The convex portions leave space for a carrying handle at a rear side of the playback device 100, for example. The concave portion partially surrounds the transducer 114 and maintains a constant radial separation from a center portion of the transducer 114, through which the axis AB passes, which is advantageous for reducing detrimental interference effects, as will be described later. In this embodiment, the axial wall 104 subtends an angle of 102 degrees from the axis AB.

FIGS. 3A-3D are cross-sectional side views of a waveguide portion along corresponding angles around the axis of the playback device of FIG. 1. The cross-section in the plane ABCD, as shown in FIG. 3A, follows a path having a first substantially S-shaped, serpentine section 300a comprising a first local minimum 302a, a first point of inflection 304a, and a first radial portion 306a, the first radial portion 306a extending toward the opening 120. The first radial portion 306 is perpendicular to the axis AB, which results in a maximum intensity of acoustic waves being emitted in a direction perpendicular to the axis AB. It is envisaged that, during operation, the playback device 100 will often be positioned with the axis AB in a vertical direction, and with the opening 120 at a similar elevation to the ears of listeners. It is therefore desirable for a maximum intensity of acoustic waves to be emitted in a direction perpendicular the axis AB.

The cross-section in the plane ABLM (which has an angle of 30 degrees to the plane ABCD, as shown in FIG. 2), is shown in FIG. 3B and follows a path having a second substantially S-shaped, serpentine section 300b comprising a second local minimum 302b, a second point of inflection 304b, and a second radial portion 306b. The second radial portion 306b extends toward the opening 120 and is perpendicular to the axis AB. The radial distance from the axis AB to the opening 120 in the ABLM cross-section is greater than the radial distance from the axis AB to the opening 120 in the ABCD cross-section, and accordingly the radial extent $x_b$ of the second S-shaped section 300b is greater than the radial extent $x_a$ of the first S-shaped section 300a.

The axial depth of the second local minimum 302b is less than the axial depth of the first local minimum 302a, and the axial separation $y_b$ of the two ends of the second substantially S-shaped section 300b is less the axial separation $y_a$ of the two ends of the first substantially S-shaped section 300a. Furthermore, portions of the second substantially S-shaped section 300b are less curved than corresponding portions of the first substantially S-shaped section 300a.

The cross-section in the plane ABNP (which has an angle of 60 degrees with respect to the plane ABCD, as shown in FIG. 2), is shown in FIG. 3C and follows a path having a third substantially S-shaped, serpentine section 300c comprising a third local minimum 302c, a third point of inflection 304c, and a third radial portion 306c. The third radial portion 306c extends toward the opening 120 and is perpendicular to the axis AB. The radial distance from the axis AB to the opening 120 in the ABNP cross-section is greater than the radial distance from the axis AB to the opening 120 in the ABLM cross-section, and accordingly the radial extent $x_c$ of the third S-shaped section 300b is greater than the radial extent $x_b$ of the second S-shaped section 300a.

The axial depth of the third local minimum 302c is less than the axial depth of the second local minimum 302a, and the axial separation $y_c$ between the two ends of the third substantially S-shaped section 300c is less the axial separation $y_b$ of the two ends of the second substantially S-shaped section 300b. Furthermore, portions of the third substantially S-shaped section 300b are less curved than corresponding portions of the second substantially S-shaped section 300a.

The cross-section of the waveguide 100 in the plane ABEF, as shown in FIG. 3D, follows a path having a straight section 300d. The substantially straight section 300d extends toward the opening 120 and is perpendicular to the axis AB. The radial distance from the axis AB to the opening 120 in the ABEF cross-section is greater than the radial distance from the axis AB to the opening 120 in the ABNP cross-section, and accordingly the radial extent $x_d$ of the straight section 300d is greater than the radial extent $x_c$ of the third S-shaped section 300a.

Although the radial distance from the axis AB to the opening 120 is different in each of the cross-sections of FIGS. 3A-3D, the varying curvature and axial variation of the waveguide, as described above, result in an acoustic path length within the waveguide 112, between the transducer 114 and the opening 120, that is substantially the same (e.g., within about 1%, within about 2%, within about 5%, within about 10%) for each of the cross-sections. Moreover, an acoustic path length within the waveguide 112, between the transducer 114 and the opening 120, is substantially constant and independent of azimuthal angle about the axis AB. In this embodiment, the acoustic path length is constant between the center portion of the transducer 114, through which the axis AB passes, and the opening 120.

Figure 4:
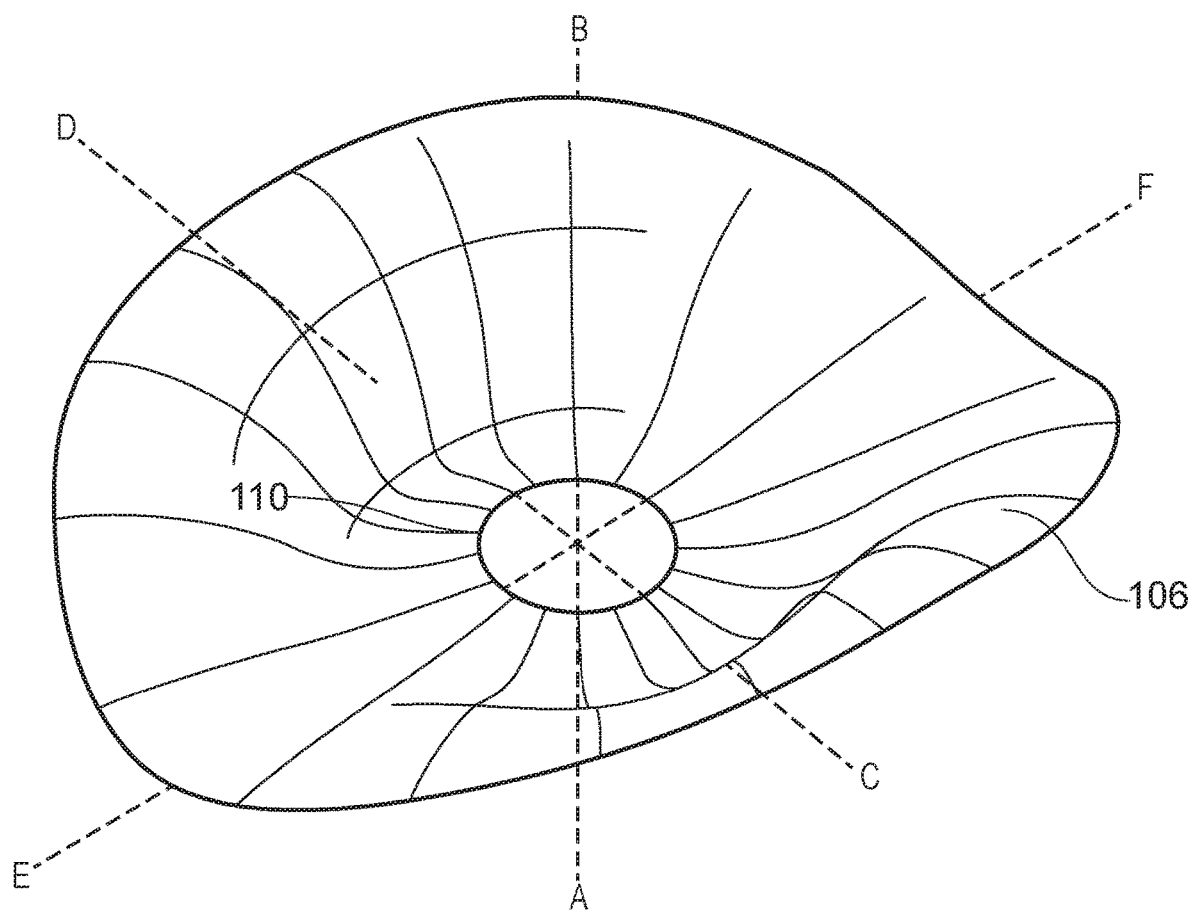
FIG. 4 is an isometric view of an upper surface of a waveguide.

FIG. 4 is an isometric view of an upper surface of a waveguide. FIG. 4 shows a contour corresponding to the upper surface 106 of the waveguide 100, omitting the axial wall 104 for clarity. As described above, the upper surface 106 has an aperture 110 for receiving the transducer 114. The upper surface 106 is smoothly contoured so that as the radial distance to the axis AB varies, the curvature and axial extent of the upper surface 106 vary to compensate the variation in radial distance, such that the acoustic path length from the transducer 114 to the opening 120 remains substantially constant. Each of the curves drawn on the surface 106 has an equal length and represents an acoustic path from the transducer 114 to the opening 120. The length of each curve in this embodiment is a predetermined length, corresponding to the radial extent $x_d$ of the straight section in FIG. 3D. In some embodiments, for example, the length is between about 40 mm and about 70 mm, between about 55 mm and about 65 mm, or approximately 63 mm. In other examples the acoustic path length may be different, for example, depending on the relative size of the housing and transducer.

The contouring of the waveguide in the illustrated embodiment has been selected to minimize sharp variations or areas of high curvature inside the waveguide, whilst maintaining an acoustic path length between the transducer and the opening that is substantially constant and independent of azimuthal angle about the axis AB. As those of ordinary skill in the art will appreciate, sharp variations inside a waveguide may lead to undesirable acoustic effects such as internal reflections and dispersion. For each cross-section coplanar with the axis AB, the radial extent of the substantially S-shaped section is predetermined by the radial distance between the axis AB and the opening 120, which in turn is substantially predetermined by the stadium shape of the playback device 100. In this embodiment, the curve of the S-shaped section in each cross-section is defined by four control points, as shown in FIGS. 3A, 3B, and 3C, and a curve-fitting algorithm is used to determine a smoothest curve between the four control points, subject to the constraint that the curve for each cross-section must be perpendicular to the axis at both ends of the S-shaped section. In this embodiment, for each cross-section, the relative Cartesian positions of the control points with respect to a first control point at the transducer end of the S-shaped section are given by (0, 0), (x/4, −y/5), (x, y), (5x/6, 1.1y), where y is the radial extent of the S-shaped cross-section as predetermined by the dimensions of the playback device 100, and where x is varied such that the length of the curve is given by $y_d$, where in this embodiment $y_d$=63.45 mm.

Providing an equal acoustic path length from the transducer 114 to the opening 120 can result in waves generated by the transducer 114 that reach the opening 120 with a phase that is substantially constant and independent of azimuthal angle about the axis. Acoustic wave fronts propagating from the opening 120 can therefore spread out more evenly than conventional waveguides with varying pathlengths, resulting in substantially uniform directivity in which listeners positioned at different locations around the playback device 100 will have similar listening experiences. By contrast, if the acoustic path length within the waveguide was not substantially constant, wave fronts would propagate from the opening 120 at frequency-dependent angles, potentially resulting in non-uniform, frequency-dependent directivity. In particular, frequency-dependent directivity may result in frequency-dependent regions of destructive and constructive interference, such that listeners at different locations may have different listening experiences, even if the listeners are positioned at substantially the same distance away from the playback device 100.

Figure 5B:
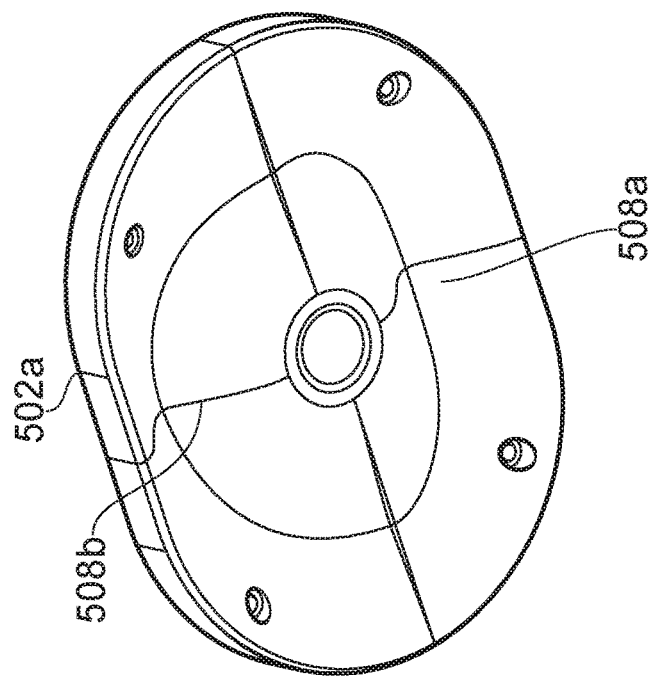
FIG. 5B is a top view of an upper surface of a waveguide of the playback device of FIG. 5A.
Figure 5A:
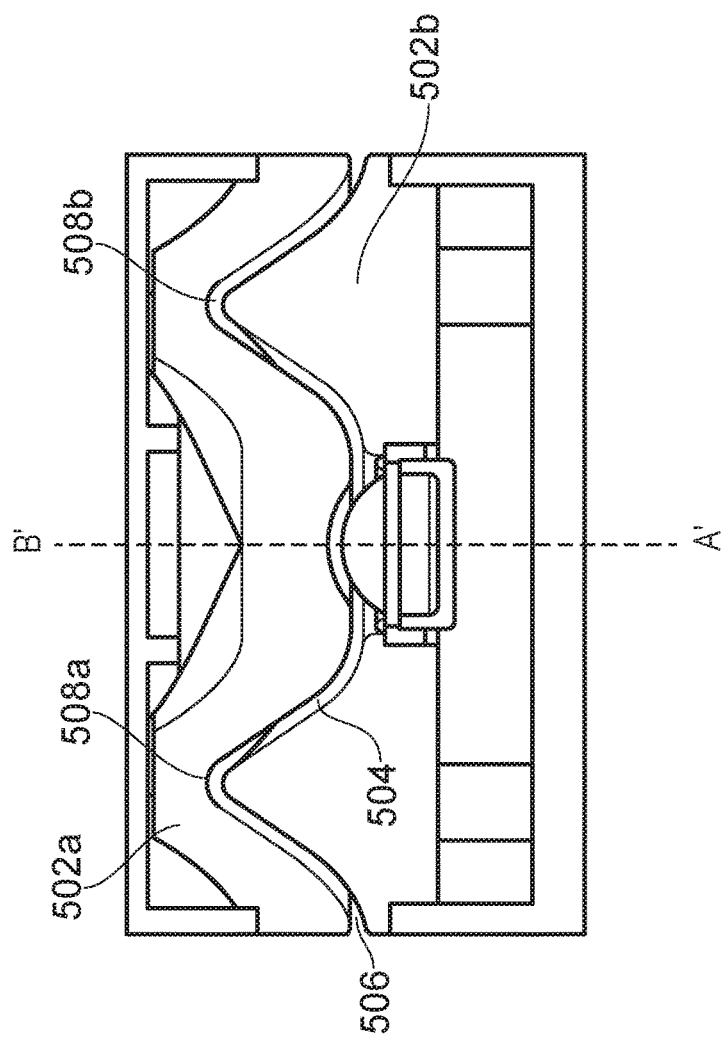
FIG. 5A is a cross-sectional side view of a portion of a playback device configured in accordance with another embodiment of the disclosed technology.

Other examples are envisaged in which an acoustic path length within a waveguide is substantially constant. In some examples, the axial separation of two ends of a waveguide section is substantially constant and independent on azimuthal angle, and a variation in radial distance is compensated by varying the curvature of one or more portions of a waveguide. FIG. 5A is a cross-sectional side view of a portion of a playback device configured in accordance with another embodiment of the disclosed technology. FIG. 5A shows a cross-section of a playback device 500 in a plane coplanar with an axis A'B'. The playback device 500 has a stadium-shaped cross-section in a plane perpendicular to the axis A'B', and has an upper housing 502a and a lower housing 502b, which delimit a waveguide 504 having an opening 506 that extends around the axis A'B'. In this embodiment, the position of the opening is constant and independent on azimuthal angle about the axis A'B'. In order to compensate a varying radial distance between the axis A'B' and the opening 506, the waveguide is contoured to include two local maxima 508a and 508b. FIG. 5B is a top view of an upper surface of a waveguide of the playback device of FIG. 5A. FIG. 5B shows the upper housing 502a of the playback device 500.

In other examples, a variation in radial distance is compensated by varying the axial extent of a waveguide, without substantially varying the curvature of any portion of the waveguide. In some examples, a playback device further includes a low-frequency electroacoustic transducer such as a woofer. In such examples, it may be desirable to limit the axial separation between the opening of the waveguide and the low-frequency transducer, thereby limiting a separation of apparent sources of acoustic waves of different frequencies, which may otherwise give rise to an undesirable experience for listeners. In such examples, varying the curvature of one or more portions of the waveguide, for example by including local extrema in the waveguide, may provide a suitable means of compensating for a variation in radial distance. Suitable means for compensating a varying radial distance may depend on the geometry of the playback device.

In the embodiment described above, a proportion of the acoustic waves generated by the transducer 114 is reflected by the axial wall 104. The reflected acoustic waves can propagate through the waveguide 112 and are emitted from the opening 120 along with waves propagating directly from the transducer 114 toward the opening 120. Interference between the reflected waves and the direct waves may result in regions outside the playback device 100 in which the intensities of acoustic waves of particular frequencies are reduced and/or increased with respect to the direct waves alone. With reference to FIG. 2, for instance, a destructive interference region may arise between the dashed lines 200a and 200b, which corresponds to the region into which waves reflected from the axial wall 104 are emitted. As described above, the concave portion of the axial wall 104 partially surrounds the transducer 114 and maintains a constant radial separation from the center portion of the transducer 114. Acoustic waves reflected from the axial wall 104 therefore propagate in parallel with acoustic waves propagating directly from the transducer 114, potentially causing an intensity reduction of acoustic waves of particular frequencies throughout the destructive interference region 200.

Destructive interference between reflected waves and direct waves occurs when the reflected waves propagate in antiphase with the direct waves, such the phase difference between the direct waves and the reflected waves is π radians or 180°. In this embodiment, destructive interference occurs when acoustic waves generated by the transducer 114 have a wavelength that is approximately four times an acoustic path length from the center portion of the transducer 114 and the axial wall 104. After being reflected by the axial wall 104, acoustic waves of this wavelength are in antiphase with direct waves generated by the transducer 114 and therefore destructive interference occurs within the destructive interference region.

In practice, acoustic waves are not generated at a single point, but are generated throughout the central portion of the transducer (accordingly, over a central region of the cupola), leading to a frequency band over which destructive interference occurs. The frequency band contains a peak destructive interference frequency at which maximum destructive interference occurs, and extends to frequencies above and below the peak destructive interference frequency. Destructive interference further occurs at higher frequency bands containing odd multiples of the peak destructive interference frequency (for example, three times the peak destructive interference frequency and five times the peak destructive interference frequency). In this embodiment, most of these higher frequency bands are beyond the range of operation of the transducer 114, and therefore effects on acoustic waves in these bands have negligible effect on listener experience.

Figure 6:
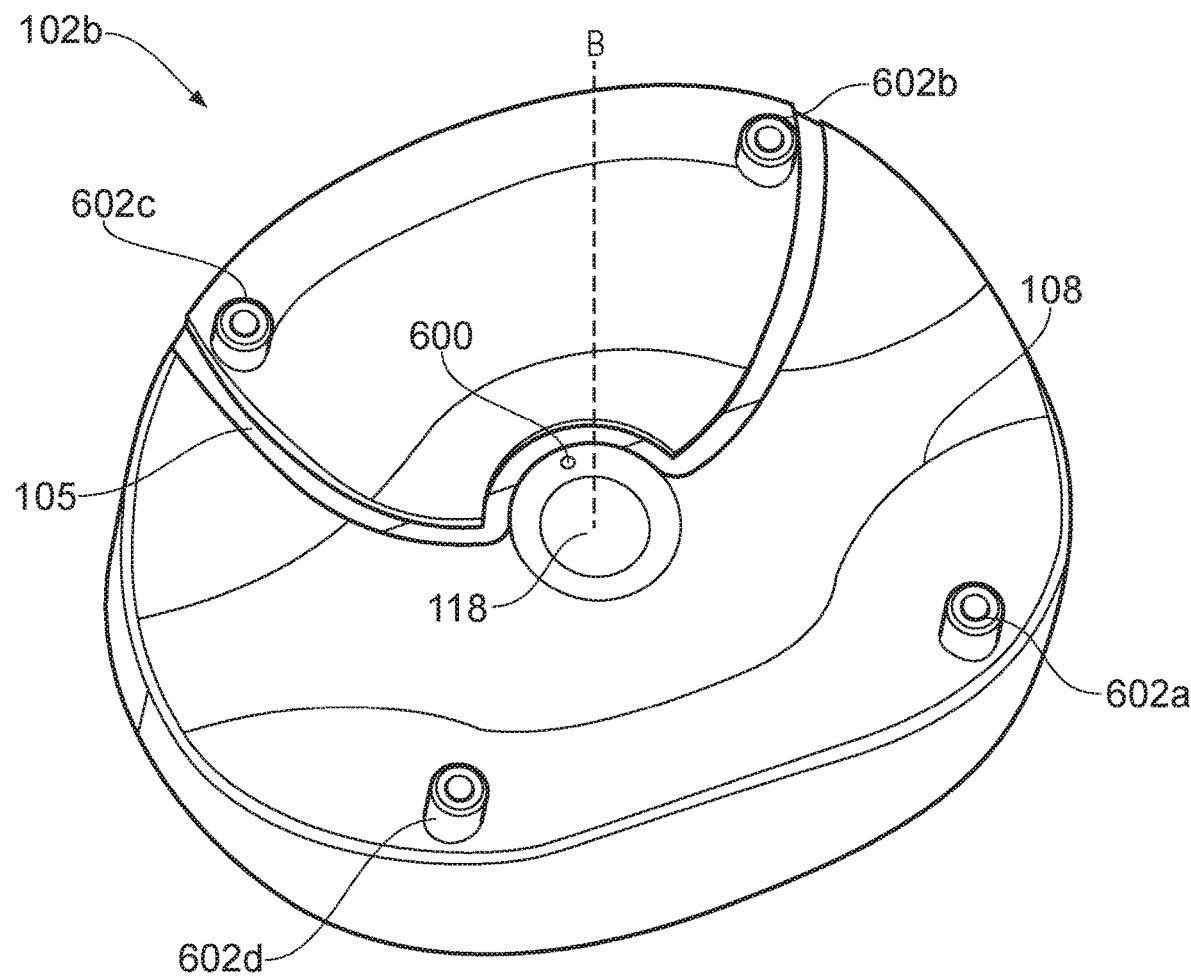
FIG. 6 is top view of a portion of the playback device of FIG. 1.

FIG. 6 is top view of a portion of the playback device of FIG. 1. FIG. 6 shows a portion of the lower housing 102b of the playback device 100 (FIG. 1), including the indent 105 for receiving the axial wall 104 of the upper housing 102a. As described above, a portion of the lower housing 102b forms the lower surface 108 of the waveguide 110, which contains the recess 118 for receiving the cupola 116 of the transducer 114. The lower surface 108 delimits an opening to a hollow tube resonator or attenuator 600 between the recess 118 and the indent 105. The hollow tube resonator 600 is thereby disposed between the axis AB and the axial wall 104. FIG. 6 further shows four axial pillars 602a, 602b, 602c, and 602d, collectively referred to as axial pillars 602, disposed within the waveguide 112. The axial pillars 602 support the upper housing 102a, and each of the axial pillars 602 is threaded to receive a screw in order to secure the upper housing 102a to the lower housing 102b. Other methods of fastening such as, for instance, bonding, snap-fit, and/or friction-fit may also be used in other examples.

The resonator 600 is configured to attenuate acoustic waves within a predetermined frequency band. In this embodiment, the predetermined frequency band corresponds to a frequency band in which destructive interference occurs between reflected and direct waves, as described above. When acoustic waves pass over one of the resonator 600 within the predetermined frequency band of the resonator, air within the hollow tube will resonate. The resulting resonance is substantially in antiphase with the acoustic waves passing over the resonator, and causes partial cancellation of oscillations of a pressure field caused by the acoustic wave. The resonator 600 thereby acts as an absorber of acoustic wave energy. As a result of the cancellation, oscillations of the resultant pressure field are attenuated, causing attenuation of the acoustic waves reflected by the axial wall 104 and propagating toward the opening 120. Accordingly, the effect of destructive interference of waves within the predetermined frequency band of the resonator is reduced, and a variation of intensity around the axis AB of acoustic waves generated by the transducer 114 and emitted from the opening 120, within the predetermined frequency band of the resonator, is reduced.

The predetermined frequency band for the resonator 600 overlaps with a frequency band in which destructive interference occurs. As explained above, destructive interference occurs within a frequency band that contains a peak destructive interference frequency and extends to frequencies above and below the peak destructive interference frequency. Similarly, the predetermined frequency band of a resonator has a peak resonant frequency and extends to frequencies above and below the peak resonant frequency. A peak resonant frequency of a resonator corresponds to a maximum attenuation frequency, at which attenuation of waves passing over the resonator is maximum. The peak destructive interference frequency in this embodiment approximately corresponds to that of acoustic waves with a wavelength that is four times an acoustic path length from the center portion of the transducer 114 and the axial wall 104. In this embodiment, the predetermined frequency band for the resonator 600 includes the frequency corresponding to acoustic waves with a wavelength that is four times an acoustic path length from the center portion of the transducer 114 and the axial wall 104.

Figure 7:
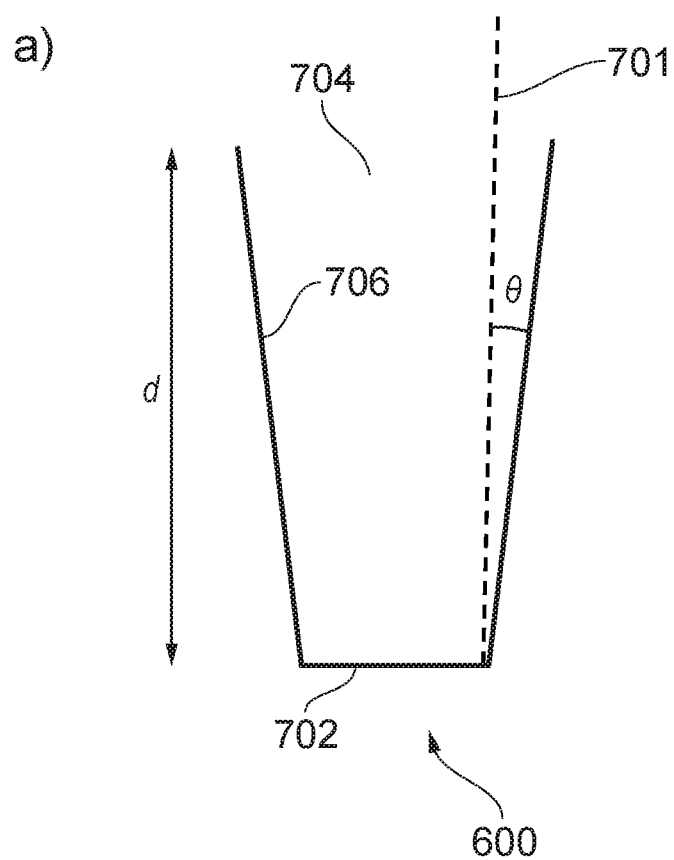
FIG. 7 is a schematic cross-sectional view of hollow tube resonator configured in accordance with embodiments of the disclosed technology.

FIG. 7 is a schematic cross-sectional view of hollow tube resonator configured in accordance with embodiments of the disclosed technology. FIG. 7 shows a cross-section of the hollow tube resonator 600 in a plane parallel to the axis AB. The dashed line 701 in FIG. 7 is parallel to the axis AB. The resonator 600 has a substantially flat circular lower surface 702 disposed at an axial depth d from an open end 704. The resonator 600 further has a conical curved surface 706 inclined at a draft angle θ' to the axis AB. In this embodiment, θ' is approximately 1.5 degrees, the draft depicted in FIG. 7 is shown larger then 1.5 degrees for clarity. The resonator 600 therefore has the shape of a frustum, of which the cross-sectional area in planes perpendicular to the axis AB decreases with distance from the open end 704. Providing a non-zero draft angle, such that the cross-sectional area decreases with distance from the open end 704, assists in the manufacture of the lower housing 102b. For example, the non-zero draft angle may facilitate the removal of a mold when the portion of the lower housing forming the resonator is manufactured by a molding process. In some examples, a draft angle of zero may be used. In other examples, a suitable draft angle of greater or less than 1.5° may be used. In some instances, varying the draft angle can have an effect on the frequency band of a resonator, and it may be beneficial to keep the draft angle relatively small, for example less than 10 degrees or less than 5 degrees.

Due to the relatively small draft angle θ, a first peak resonant frequency approximately corresponds to acoustic waves having a wavelength four times the axial depth of the resonator 600. For a hollow tube resonator, further peak resonant frequencies occur approximately at odd multiples of the first peak resonant frequency. In the present embodiment, the predetermined frequency band of the resonator 600 overlaps with a frequency band within which destructive interference occurs, which including a peak destructive interference frequency. Higher resonant frequency bands of the resonator 600 also overlap with higher frequency bands containing odd multiples of the peak destructive interference frequency. As discussed above, destructive interference may also occur within these higher frequency bands. The resonator 600 is therefore also configured to reduce destructive interference in these higher frequency bands, to the extent that they correspond to frequencies generated by the transducer. In other examples the absorber may be configured to reduce signals at the peak destructive interference frequency without considering other frequencies.

Figure 8:
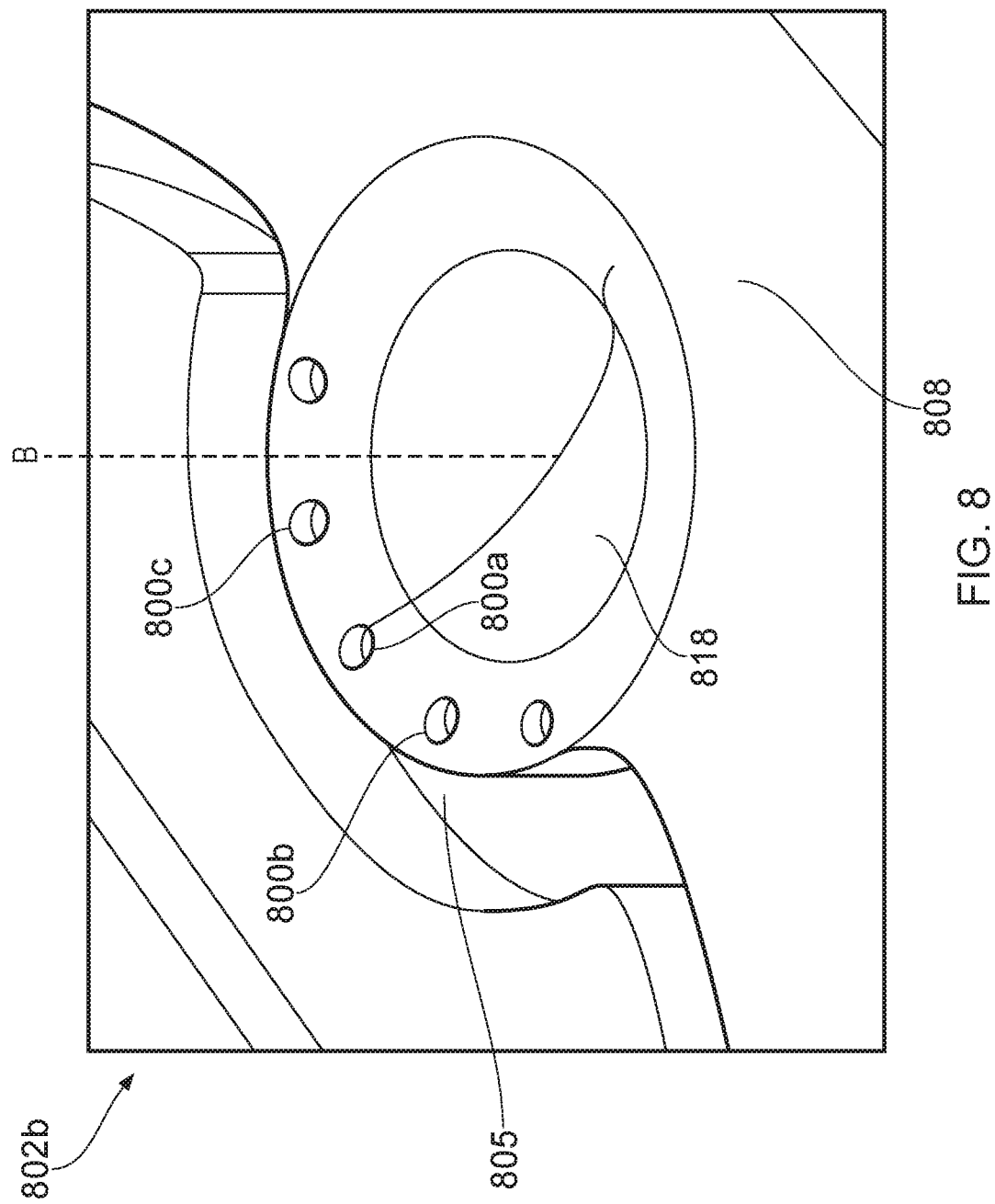
FIG. 8 is an isometric view of a portion of a playback device configured in accordance with another embodiment of the disclosed technology.

FIG. 8 is an isometric view of a portion of a playback device configured in accordance with another embodiment of the disclosed technology. FIG. 8 shows a portion of the lower housing 802b of a playback device. In some embodiments, for instance, the playback device has the same or similar construction as the playback device 100 (FIG. 1), but with a different configuration of absorbers, as will be described hereafter. The lower housing 802b defines an indent 805 for receiving an axial wall of an upper housing. A portion of the lower housing 802 forms a lower surface 808 of a waveguide, which contains a recess 818 for receiving a cupola of an electroacoustic transducer. The lower surface 808 is indented between the recess 818 and the indent 805 to form hollow tube resonators, including hollow tube resonators 800a, 800b, and 800c. The resonators 800a, 800b, and 800c are thereby disposed between the axis AB and the axial wall 104. The playback device 100' has five hollow tube resonators in total.

Each of the resonators 800a, 800b, and 800c is configured to attenuate acoustic waves within a respective predetermined frequency band. In this embodiment, the respective predetermined frequency band for each of the resonators corresponds to a frequency band in which destructive interference occurs between reflected and direct waves, as described above.

In the present embodiment, the predetermined frequency band for each of the resonators 800a, 800b, and 800c overlaps with a frequency band in which destructive interference occurs. The predetermined frequency band for each of the resonators 800a, 800b, and 800c includes the frequency corresponding to acoustic waves with a wavelength that is four times an acoustic path length from the center portion of the transducer and the axial wall.

FIGS. 9A-9C are cross-sectional views of three corresponding hollow tube resonators 800a, 800b, and 800c, in a plane parallel to the axis AB. The dashed lines in FIGS. 9A, 9B, and 9C are parallel to the axis AB. Resonator 800a has a shape similar to that of the resonator 600 shown in FIG. 7, but has an axial depth of $d_a$ and a draft angle of $\theta_a$.

Resonator 800b and hollow tube resonator 800c have shapes similar to that of resonator 800a, the shapes being frustums with draft angles of $\theta_b$ and $\theta_c$ respectively. In this embodiment, $\theta_a$, $\theta_b$, and $\theta_c$ are all approximately equal to 1.5 degrees, but they may be different in other examples. The axial depth of resonator 800b is $d_b$ and the axial depth of resonator 800c is $d_c$. In this embodiment, the axial depth $d_c$ of resonator 800c is equal to the axial depth $d_a$ of resonator 800a. The axial depth $d_b$ of resonator 800b is greater than the axial depth $d_a$ of resonator 800a. The predetermined frequency band for resonator 800b is lower than the predetermined frequency band for resonator 800a and resonator 800c. In particular, the lowest peak resonant frequency of resonator 800b is lower than the lowest peak resonant frequency of resonators 800a and 800c. Accordingly, the maximum attenuation frequency in the predetermined frequency band of resonator 800b is lower than the maximum attenuation frequency in the predetermined frequency band of resonators 800a and 800c. The resonators are configured such that a target frequency is included in a range between the maximum attenuation frequency of resonator 800b and the maximum attenuation frequency of resonators 800a and 800c. In this embodiment, the target frequency corresponds to acoustic waves having a wavelength that is four times an acoustic path length between the center portion of the transducer and the axial wall. As discussed above, this target frequency is approximately equal to the peak destructive interference frequency. Having at least one absorber configured to attenuate acoustic waves at a frequency below a target frequency, and at least one absorber configured to attenuate waves at a frequency above a target frequency, where the target frequency is approximately equal to the peak destructive interference frequency, allows for attenuation of acoustic waves over a large proportion of the frequency band within which destructive interference occurs.

Figure 10B:
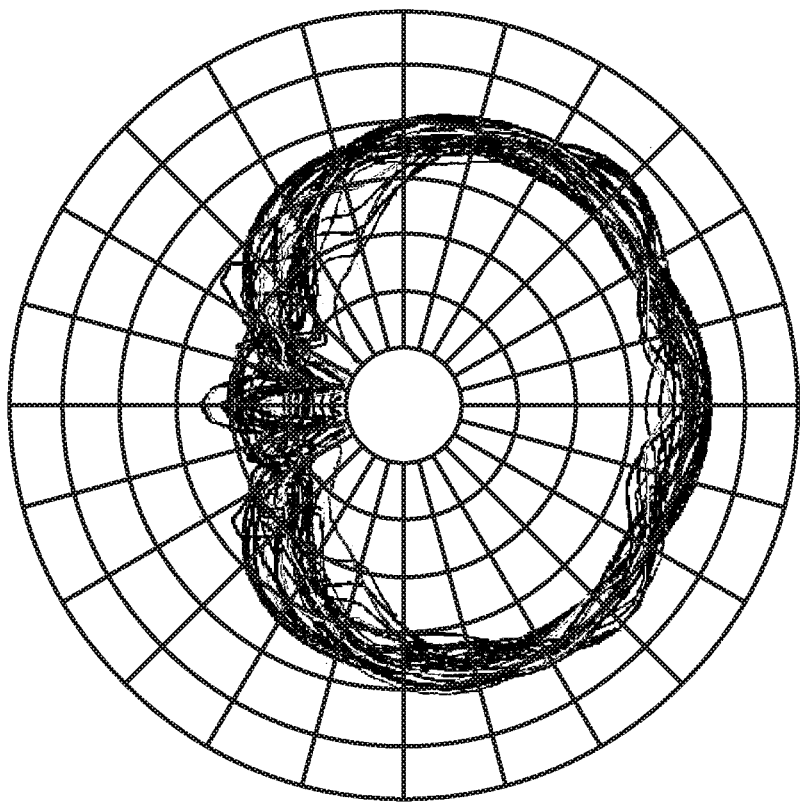
FIG. 10B is a second polar plot of frequency components of an acoustic signal generated by an electroacoustic transducer.
Figure 10A:
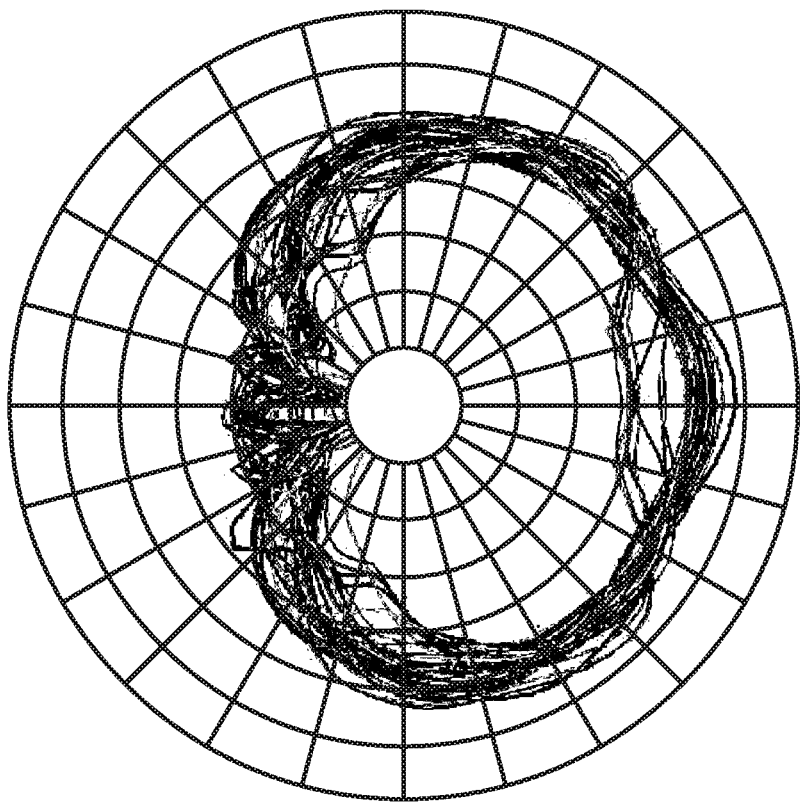
FIG. 10A is a first polar plot of frequency components of an acoustic signal generated by an electroacoustic transducer.

FIGS. 10A and 10B are corresponding polar plots of frequency components of an acoustic signal generated by an electroacoustic transducer. FIGS. 10A and 10B show experimental results demonstrating the effect of disposing absorbers between a central axis and an axial wall of a playback device as described above. Each of the curves in FIGS. 10A and 10B corresponds to acoustic waves of a particular frequency, the radial distance of the curve from the origin representing the intensity of the acoustic waves of that frequency. To generate the curves, a tone of particular frequency is emitted by the transducer and the received intensity at various azimuth angles is measured. The process is then repeated at different frequencies. FIG. 10A corresponds to an experiment in which no absorbers were included in the waveguide. A significant reduction in the intensity of waves within a frequency band is observed in a destructive interference region. In this embodiment, a peak destructive interference frequency of around 7 kHz is observed which depends on the particular dimensions of the device under test. FIG. 10B corresponds to an experiment in which three hollow tube resonators are disposed between the central axis and the axial wall. In this embodiment, a first resonator having a maximum attenuation frequency of around 6.8 kHz is disposed azimuthally between a second and a third resonator each having a maximum attenuation frequency of around 7.2 kHz. The intensity of waves in the frequency band is increased in the destructive interference region compared with FIG. 10A, demonstrating that the effect of destructive interference has been reduced. The variation of intensity around the central axis of the acoustic waves within the frequency band is thereby reduced by the inclusion of absorbers. Providing a more uniform directivity may result in an improved user perception of sound quality across a wider area.

The resonators shown in FIG. 8 are disposed the same distance from the center portion of the transducer 114, and are evenly spaced around the center portion of the transducer 114. In other words, the resonators may have a substantially equal radial spacing about the center portion of the transducer. In this embodiment, spacing the absorbers evenly minimizes directional variation in the attenuation of acoustic waves. In other examples, resonators may not be disposed the same distance from a center portion of a transducer, or may not be evenly spaced around a center portion of a transducer. This may particularly be the case in examples where an axial wall does not include a circular concave section. For example, multiple resonators may be disposed at different distances from a center portion of a transducer. This may allow more resonators to be included, which may allow for the attenuation of acoustic waves having a greater range of frequencies. In some examples, different numbers of resonators are used, for example three resonators.

In some examples, different types of absorbers are used instead of the resonators described above. For example, closed hollow tube resonators may have different shapes to the resonators described above. Closed hollow tube resonators may have circular cross-sections of different sizes, or may have non-circular cross-sections. Varying the shape of a hollow tube resonator affects the peak resonant frequencies of the resonator, and also the sharpness of the associated resonance peaks. This further affects the width of the frequency bands over which attenuation of acoustic waves may be achieved. In other examples, hollow tube resonators may be used that are open at both ends. In contrast with closed hollow tube resonators such as those described above, open hollow tube resonators, which are open at both ends, have peak resonant frequencies that are approximately even multiples of a lowest peak resonant frequency. In the absence of absorbers, it is expected that constructive interference will occur at higher frequency bands including even multiples of the peak destructive interference frequency. Using open hollow tube resonators to attenuate acoustic waves in a frequency band including the peak destructive interference frequency may therefore reduce the effects of constructive interference in these higher frequency bands.

In some examples, acoustic dampers may be used as absorbers, for example foam acoustic dampers. Acoustic damping may attenuate acoustic waves over a broader frequency range than resonators, but may have other detrimental effects such as those resulting from absorption of acoustic waves in frequency bands not prone to destructive interference.

Different numbers of absorbers may be used in certain embodiments. For example, a single absorber may be simpler to manufacture than more than one absorber, but may not provide as effective performance. The number of absorbers included in a particular example may balance the complexity of manufacture against the uniformity of response achieved.

Figures 11, 12:
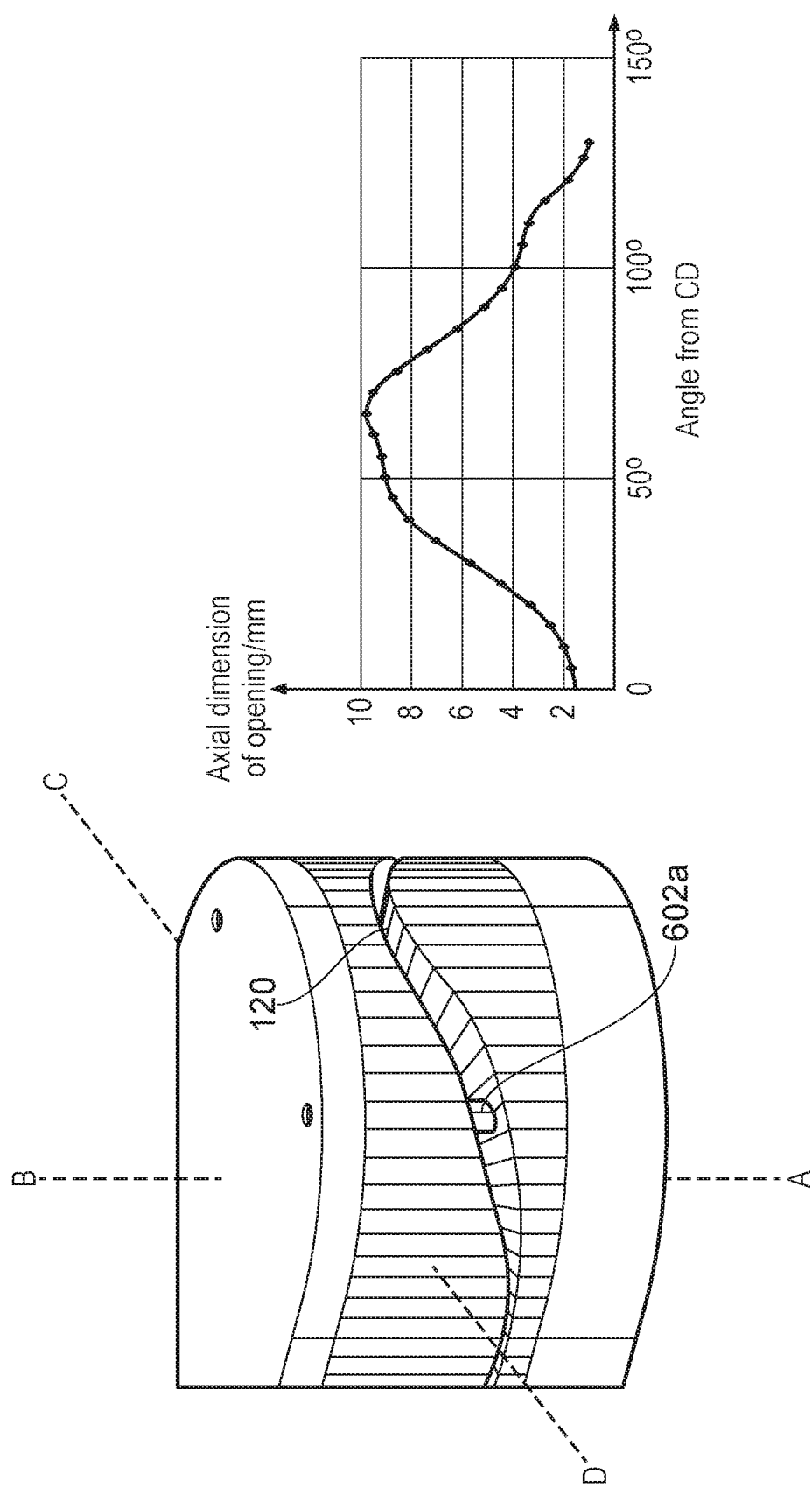
FIG. 11 is an isometric side view of a portion of the playback device of FIG. 1.
FIG. 12 is a plot showing angular variation of an axial dimension of a waveguide opening.

In some embodiments, an opening of a waveguide has an axial dimension that varies with an azimuthal angle about an axis. FIG. 11 is an isometric side view of a portion of the playback device of FIG. 1. As shown, the opening 120 has a dimension in a direction aligned with the axis AB that varies with an azimuthal angle about the axis AB. Varying the dimension of the opening 120 with azimuthal angle about the axis AB can reduce a variation of intensity around the axis AB of acoustic waves generated by the transducer 114 and emitted from the opening 120. A variation of intensity around the axis AB may be caused by the non-circular geometry of the playback device (as described above, a projection of the opening 120 onto a plane perpendicular to the axis AB follows an arc of a stadium). A variation of intensity around the axis AB may also be caused by other features of the geometry of the playback device 100, for example the axial pillars 602.

In the playback device 100, experiments were performed to determine a suitable variation of the axial dimension of the opening 120 with azimuthal angle. Table 1 below shows the resulting axial dimension of the opening 120 at different angles from CD. The opening heights have reflective symmetry about the plane ABCD due to the symmetry of the playback device about this plane. The maximum angle from CD in this embodiment is 129 degrees, corresponding to the angle at which the axial wall 104 interrupts the opening 120. FIG. 12 shows a plot of the variation of the axial dimension of the opening 120 with azimuthal angle from CD. The opening height was determined by measuring the intensity across the frequency range at each azimuth angle by testing a waveguide with the same path lengths and internal construction but with a constant, predetermined axial dimension. The intensity measurements may be made substantially tangential to the waveguide opening. From the measured intensity a desired gain or reduction to provide substantially uniform intensity across all azimuth angles was determined. For example, a larger axial dimension will tend to provide a more narrow beam in the vertical dimension than a smaller axial opening because of diffraction.

Variation in the axial dimension (the opening height) provides control of intensity across the frequency range. A larger opening will increase the intensity of the sound reaching a listener at that angle while a smaller opening will decrease the intensity of the sound reaching the listener. The adjustment in intensity at a particular azimuth angle relative to the sound pressure level (SPL) at a reference 0 degree angle is determined by the relation: $SPL = 10 \log_{10}(w/w_{ref})$, where w is the axial dimension of the slit at the particular azimuth dimension and $w_{ref}$ is the axial dimension at zero degrees. Applying this relation to the required changes in SPL at different angles from line CD (which is $w_{ref}$) leads to the following example values for the axial dimension, set out in Table 1. At the same time, the maximum axial dimension may be kept relatively small relative to the smallest wavelengths of sound in the waveguide to reduce the effect of any beam-forming in the vertical direction. As can be seen in Table 1 below, in the embodiment of FIG. 1, the maximum axial dimension is 9.86 mm, which is smaller than the wavelength (around 17 mm) of a 20 kHz soundwave in air, for example.

TABLE 1

| Angle from CD (degrees) | Axial dimension/mm |
| --- | --- |
| 0 | 1.62 |
| 5 | 1.72 |
| 10 | 2.02 |
| 15 | 2.56 |
| 20 | 3.36 |
| 25 | 4.44 |
| 30 | 5.75 |
| 35 | 7.08 |
| 40 | 8.19 |
| 45 | 8.82 |
| 50 | 9.08 |
| 55 | 9.23 |
| 60 | 9.54 |
| 65 | 9.86 |
| 70 | 9.63 |
| 75 | 8.69 |
| 80 | 7.47 |
| 85 | 6.26 |
| 90 | 5.19 |
| 95 | 4.44 |
| 100 | 3.95 |
| 105 | 3.70 |
| 110 | 3.47 |
| 115 | 2.80 |
| 120 | 1.87 |
| 125 | 1.22 |
| 129 | 1.01 |

FIGS. 13A, 13B, 14A, 14B, 15A, 15B, 16A, 16B, and 17 show further embodiments of playback devices in which an axial dimension of an opening varies with azimuthal angle. In each of these embodiments, an angular variation of intensity of waves generated by the playback device may result from the geometry of the playback device. The variation of the axial dimension of the opening reduces this variation of intensity.

Figure 13B:
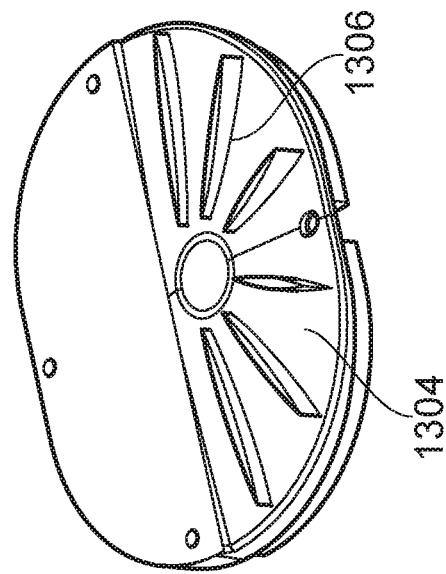
FIG. 13B is a top view of an upper surface of a waveguide of the playback device of FIG. 13A.
Figure 13A:
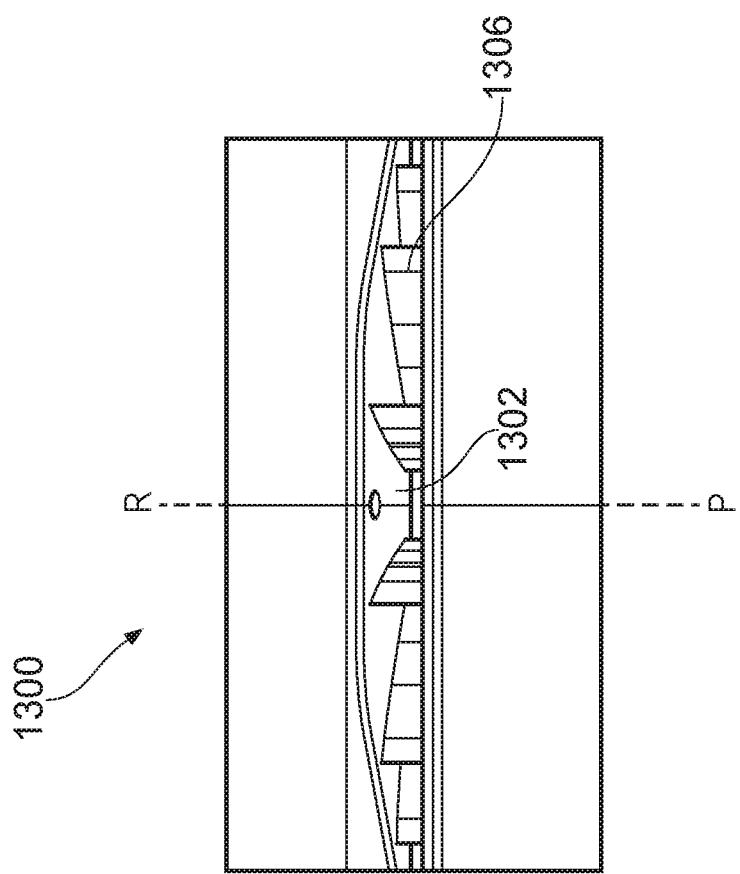
FIG. 13A is a side view of a portion of a playback device configured in accordance with another embodiment of the disclosed technology.

FIG. 13A is a side view of a portion of a playback device configured in accordance with another embodiment of the disclosed technology. FIG. 13A shows a playback device 1300 in which an opening 1302 varies with azimuthal angle about an axis PR. The playback device 1300 has a substantially stadium-shaped cross-section in a plane perpendicular to the axis PR. FIG. 13B is a top view of an upper surface of a waveguide of the playback device of FIG. 13A. A waveguide surface 1304 of the playback device 1300 includes radially-extending fins that create substantially radial waveguide channels.

Figure 14B:
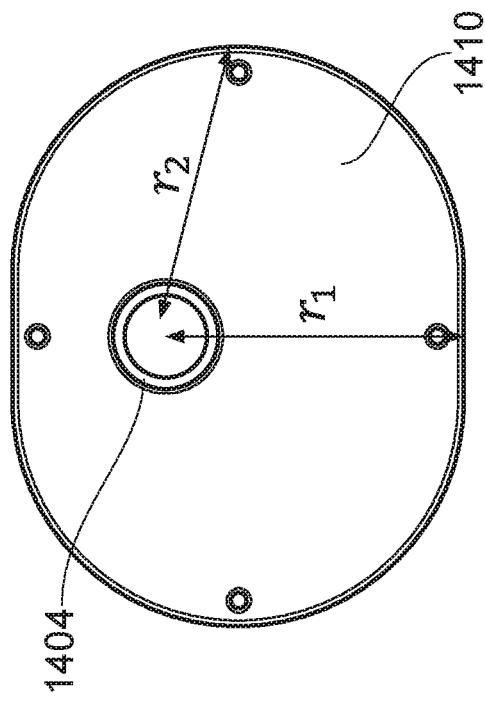
FIG. 14B is a plan view of an upper surface of a waveguide of the playback device of FIG. 14A.
Figure 14A:
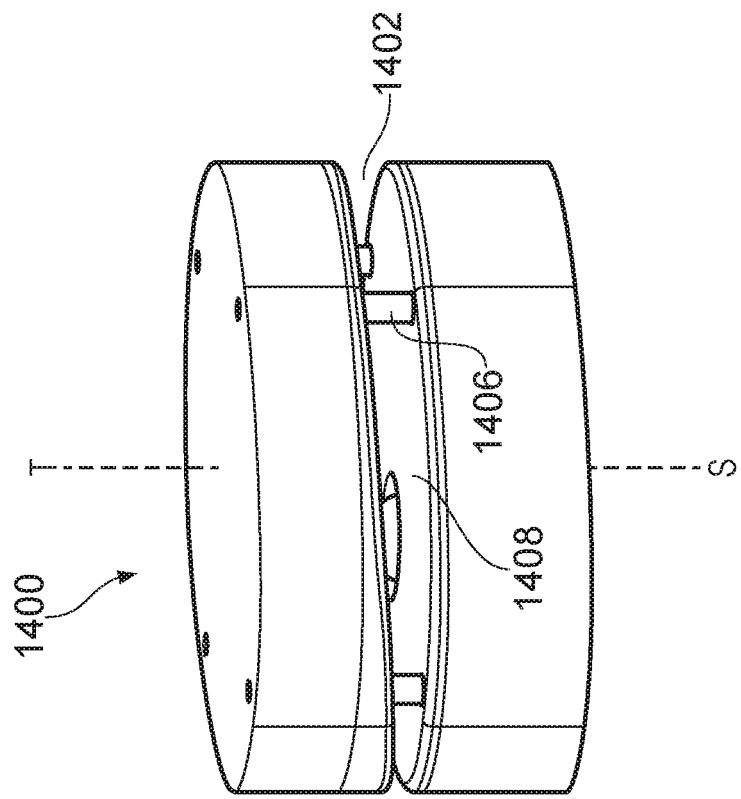
FIG. 14A is an isometric side view of a portion of a playback device configured in accordance with another embodiment of the disclosed technology.

FIG. 14A is an isometric side view of a portion of a playback device configured in accordance with another embodiment of the disclosed technology. FIG. 14A shows a playback device 1400 in which an opening 1402 varies with azimuthal angle about an axis ST. FIG. 14B is a plan view of an upper surface of a waveguide of the playback device of FIG. 14A. An electroacoustic transducer 1404 is disposed off-center such that a radial distance $r_1$ from the transducer 1404 to a front portion of the playback device 1400 is substantially the same as a radial distance $r_2$ to a side portion of the playback device 1400. In this embodiment, axial pillars including axial pillar 1406 are disposed within a waveguide 1408. The transducer 1404 is disposed within a lower surface 1410 of the waveguide 1408.

Figure 15B:
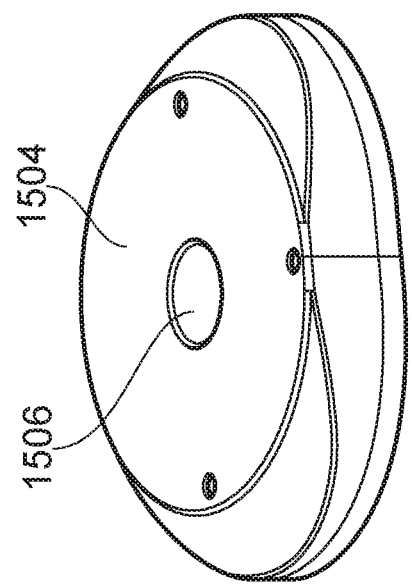
FIG. 15B is an isometric view of an upper surface of a waveguide of the playback device of FIG. 15A.
Figure 15A:
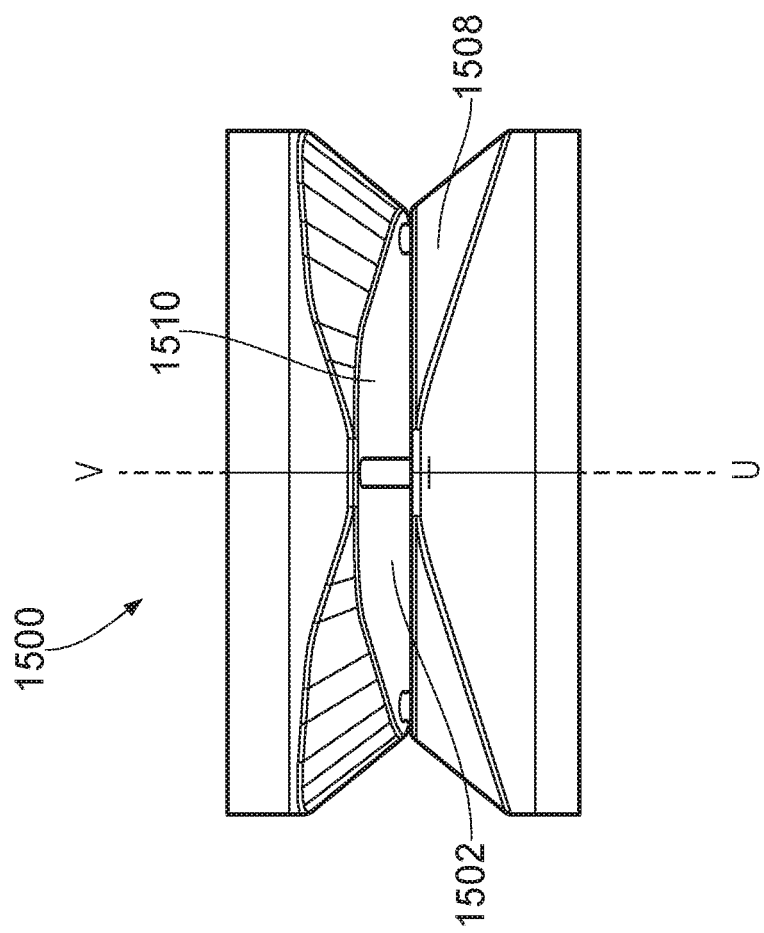
FIG. 15A is a side view of a portion of a playback device configured in accordance with another embodiment of the disclosed technology.

FIG. 15A is a side view of a portion of a playback device configured in accordance with another embodiment of the disclosed technology. FIG. 15A shows a playback device 1500 in which an opening 1502 varies with azimuthal angle about an axis UV. As shown in FIG. 15B is an isometric view of an upper surface of a waveguide of the playback device of FIG. 15A. The playback device 1500 has a circular lower waveguide surface 1504 extending to the opening 1502, such that a projection of the opening 1502 onto a plane perpendicular to the axis UV is circular. Providing a circular projection ensures that an acoustic path length between the transducer 1506 and the opening 1502 is substantially constant and independent of azimuthal angle about the axis UV. Sloped, chamfered portions, including chamfered portion 1508, extend from circular lower waveguide surface and a corresponding circular upper waveguide surface. The playback device 1500 has a substantially stadium-shaped cross-section in a plane perpendicular to the axis UV.

Figure 16B:
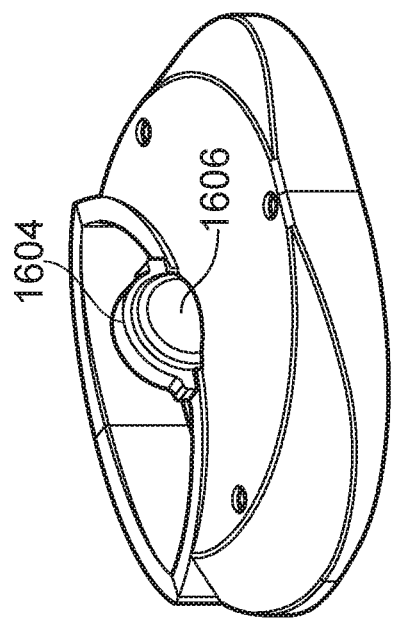
FIG. 16B is an isometric view of a waveguide of the playback device of FIG. 16A.
Figure 16A:
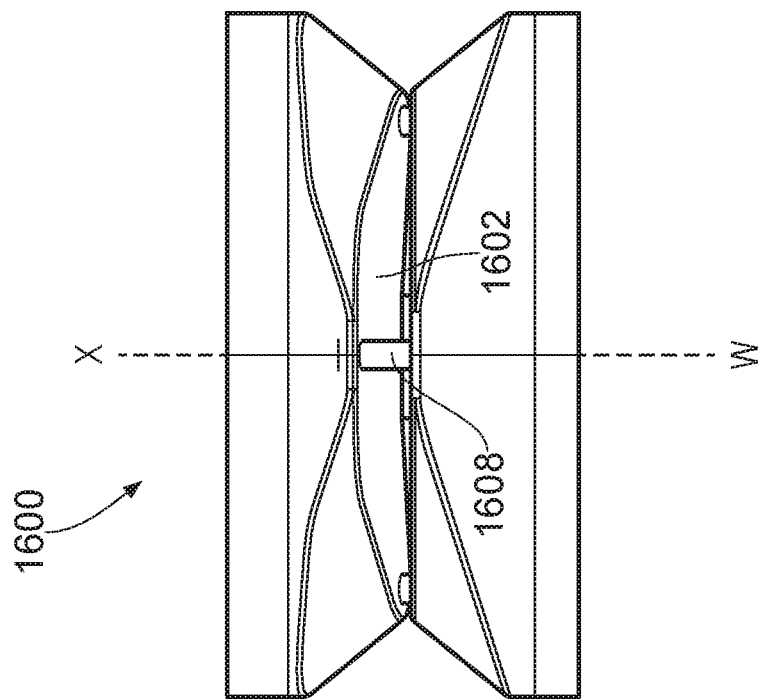
FIG. 16A is a side view of a portion of a playback device configured in accordance with another embodiment of the disclosed technology.

FIG. 16A is a side view of a portion of a playback device configured in accordance with another embodiment of the disclosed technology. FIG. 16A shows a playback device 1600 in which an opening 1602 varies with azimuthal angle about an axis WX. In this embodiment, a transducer 1604 is disposed such that in response to a received electrical signal, a diaphragm 1606 (which is shaped as a cupola in this embodiment) is displaced in a front-facing direction of the playback device 1600 that is perpendicular to the axis WX. Sloped, chamfered portions extend from a circular lower waveguide surface and a corresponding circular upper waveguide surface. The playback device 1600 has a substantially stadium-shaped cross-section in a plane perpendicular to the axis WX. FIG. 16B is an isometric view of a waveguide of the playback device of FIG. 16A.

Figure 17:
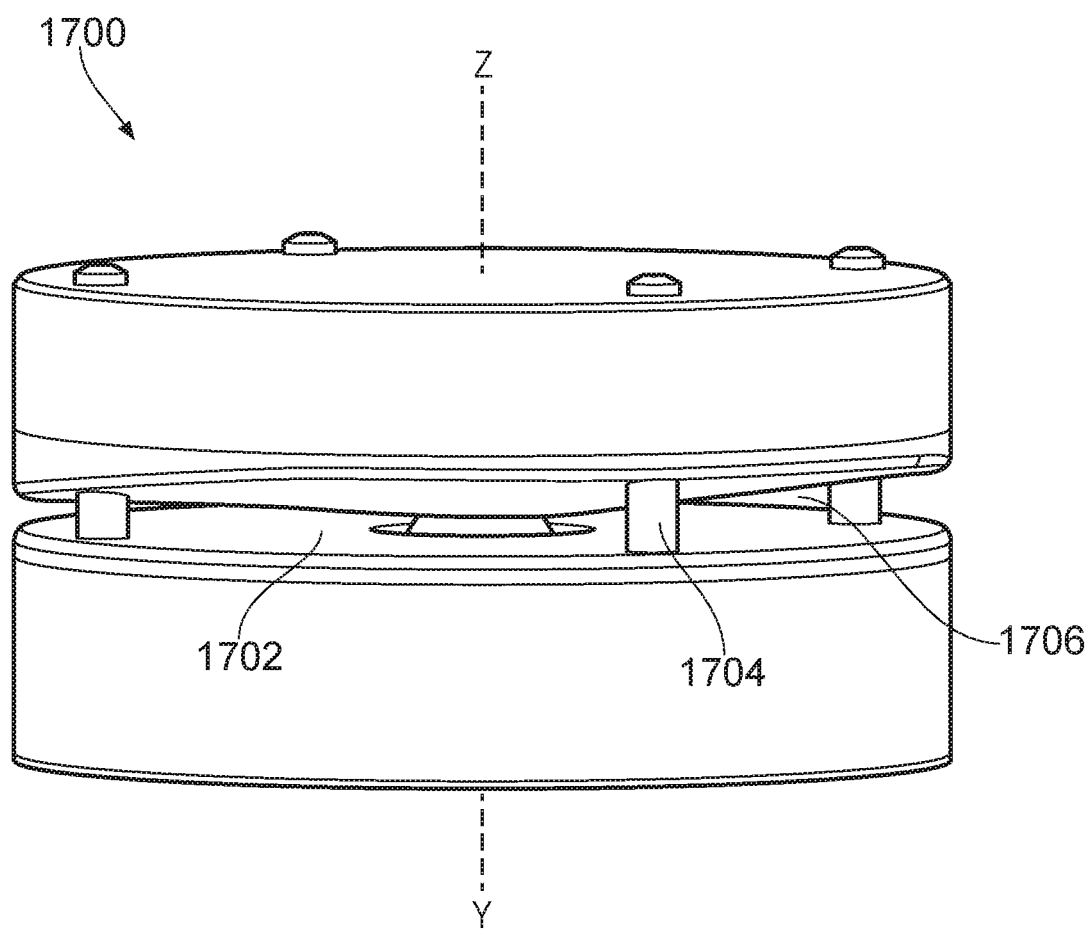
FIG. 17 is a side view of a playback device configured in accordance with another embodiment of the disclosed technology.

FIG. 17 is a side view of a playback device configured in accordance with another embodiment of the disclosed technology. FIG. 17 shows a playback device 1700 in which an opening 1702 varies with azimuthal angle about an axis YZ. The playback device 1700 has a substantially circular cross-section in a plane perpendicular to the axis YZ. Axial pillars including axial pillar 1704 are disposed within a waveguide 1706.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. For example, embodiments may use a constant acoustic path length, varying axial dimension of the waveguide and one or more absorbers alone or in any combination thereof. Each of these features contributes to improving the uniformity of the directivity of a wide dispersion waveguide. It will also be appreciated that strict adherence to the dimensions and examples given herein is not required, these will vary with the dimensions of a playback device. Furthermore, equivalents and modifications not described above may also be employed without departing from the scope of the invention, which is defined in the accompanying claims.

The invention claimed is:

1. A playback device comprising:
an electroacoustic transducer; and
a housing enclosing the electroacoustic transducer, wherein the housing comprises an acoustic waveguide configured to (i) provide an acoustic path between the electroacoustic transducer and an opening of the housing, and (ii) cause acoustic wave fronts emitted from the opening to have a substantially uniform directivity around the opening of the housing.

2. The playback device of claim 1, wherein the playback device has a substantially stadium-shaped cross section in a plane perpendicular to an axis passing through the electroacoustic transducer.

3. The playback device of claim 1, wherein the electroacoustic transducer is arranged in one of a substantially upward-facing position within the housing or a substantially downward-facing position within the housing.

4. The playback device of claim 1, wherein a length of the acoustic path varies less than about 5% as a function of azimuthal angle about an axis passing through the electroacoustic transducer.

5. The playback device of claim 1, wherein at least a portion of the acoustic waveguide has a curved cross-section in a plane coplanar with an axis passing through the electroacoustic transducer.

6. The playback device of claim 1, wherein at least a portion of the acoustic waveguide comprises:
a first curved cross-section in a first plane coplanar with an axis passing through the electroacoustic transducer; and
a second curved cross-section in a second plane coplanar with the axis passing through the electroacoustic transducer, wherein at least one section of the first curved cross-section has a greater curvature than a corresponding section of the second curved cross-section.

7. The playback device of claim 1, wherein at least a portion of the acoustic waveguide extending toward the opening extends outward in a plane perpendicular to an axis passing through the electroacoustic transducer.

8. The playback device of claim 1, wherein the electroacoustic transducer comprises a diaphragm configured to be displaced in a direction substantially aligned with an axis passing through the electroacoustic transducer in response to a received electrical signal.

9. The playback device of claim 1, wherein an acoustic path length within the acoustic waveguide between the electroacoustic transducer and the opening is substantially constant and independent of azimuthal angle about an axis passing through the electroacoustic transducer.

10. The playback device of claim 1, wherein the acoustic waveguide is bounded on one side by an axial wall, and wherein the playback device further comprises:
an absorber disposed between an axis passing through the electroacoustic transducer and the axial wall, wherein the absorber is configured to attenuate acoustic waves within a frequency band.

11. The playback device of claim 1, wherein the acoustic waveguide is bounded on one side by an axial wall, and wherein the playback device further comprises:
an absorber disposed between an axis passing through the electroacoustic transducer and the axial wall, wherein the absorber is configured to reduce a variation of intensity of acoustic waves within a frequency band emitted from the opening.

12. The playback device of claim 11, wherein the absorber comprises a hollow tube resonator.

13. The playback device of claim 12, wherein a cross-sectional area of the hollow tube resonator decreases with distance from an open end of the hollow tube resonator.

14. The playback device of claim 11, wherein the electroacoustic transducer has a center portion substantially aligned with the axis passing through the electroacoustic transducer, and wherein the frequency band includes a frequency corresponding to acoustic waves having a wavelength four times an acoustic path length between the center portion of the electroacoustic transducer and the axial wall.

15. The playback device of claim 11, wherein the absorber is a first absorber of a plurality of absorbers disposed between the axis passing through the electroacoustic transducer and the axial wall, wherein an individual absorber of the plurality of absorbers is configured to attenuate acoustic waves within a respective frequency band.

16. The playback device of claim 15, wherein individual absorbers of the plurality of absorbers are disposed substantially the same distance from a center portion of the electroacoustic transducer.

17. The playback device of claim 15, wherein individual absorbers of the plurality of absorbers are substantially evenly spaced about a center portion of the electroacoustic transducer.

18. The playback device of claim 15, wherein:
the first absorber of the plurality of absorbers is configured to attenuate acoustic waves within a first frequency band; and
a second absorber of the plurality of absorbers is configured to attenuate acoustic waves within a second frequency band, wherein the second frequency band is different from the first frequency band.

19. The playback device of claim 18, wherein a range between a maximum attenuation frequency in the first frequency band and a maximum attenuation frequency in the second frequency band includes a target frequency.

20. The playback device of claim 19, wherein the target frequency corresponds to an acoustic wave having a wavelength that is four times an acoustic path length between the center portion of the electroacoustic transducer and the axial wall.

* * * * *

UNITED STATES PATENT AND TRADEMARK OFFICE
CERTIFICATE OF CORRECTION

PATENT NO. : 11,483,643 B2
APPLICATION NO. : 16/882864
DATED : October 25, 2022
INVENTOR(S) : Michael Chamness et al.

It is certified that error appears in the above-identified patent and that said Letters Patent is hereby corrected as shown below:

On the Title Page

Item (63), which continues onto Page 2, please replace "Continuation of application No. 16/522,203, filed on Jul. 25, 2019, which is a continuation of application No. 15/942,819, filed Apr. 2, 2018, now Pat. No. 10,397,694" with -- Continuation of application No. 16/552,203, filed on Aug. 27, 2017, now Pat. No. 10,667,041, which is a continuation of application No. 15/942,819, filed Apr. 2, 2018, now Pat. No. 10,397,694 --

Signed and Sealed this
First Day of August, 2023

*Katherine Kelly Vidal*

Katherine Kelly Vidal
*Director of the United States Patent and Trademark Office*